(12) United States Patent
Huo et al.

(10) Patent No.: US 11,645,142 B1
(45) Date of Patent: May 9, 2023

(54) USE SEQUENTIAL SET INDEX FOR ROOT CAUSE LOCATION AND PROBLEM VERIFICATION

(71) Applicant: International Business Machines Corporation, Armonk, NY (US)

(72) Inventors: Zhan Peng Huo, Beijing (CN); Jia Liu, Beijing (CN); Pei Ci Fang, Beijing (CN); Nan Mu, Beijing (CN); Lin Lin LL Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/574,630

(22) Filed: Jan. 13, 2022

(51) Int. Cl.
*G06F 11/00* (2006.01)
*G06F 11/07* (2006.01)

(52) U.S. Cl.
CPC ........ *G06F 11/079* (2013.01); *G06F 11/0751* (2013.01)

(58) Field of Classification Search
CPC ..... G06F 11/079; G06F 11/0751; G06N 3/02; G06N 3/08
USPC ...................................... 714/1–57
See application file for complete search history.

(56) References Cited

U.S. PATENT DOCUMENTS

| | | | | |
|---|---|---|---|---|
| 2005/0091640 A1* | 4/2005 | McCollum | .......... | G06F 11/0793 714/E11.026 |
| 2008/0155343 A1* | 6/2008 | Branca | ................ | G06F 11/3688 714/38.14 |
| 2009/0292941 A1* | 11/2009 | Ganai | ................ | G06F 11/3636 714/2 |
| 2011/0191630 A1* | 8/2011 | Li | ........................ | G06F 11/07 714/25 |
| 2013/0117607 A1* | 5/2013 | Sanford | ................ | G06N 20/00 714/26 |
| 2017/0262360 A1* | 9/2017 | Kochura | ............ | G06F 11/3688 |
| 2019/0129832 A1* | 5/2019 | Budnik | ................ | G06F 40/205 |
| 2019/0163594 A1* | 5/2019 | Hayden | ................ | G06F 11/3024 |
| 2021/0224265 A1* | 7/2021 | Madan | ................... | G06N 20/00 |
| 2021/0248024 A1* | 8/2021 | Poola | ................... | G06F 11/0772 |

OTHER PUBLICATIONS

"Index Sequential Sets and Subsets", https://public.support.unisys.com/framework/publicterms.aspx?returnurl=%2faseries%2fdocs%2fClearPath-MCP-18.0%2f86000213-420%2fsection-000019393.html retrieved Dec. 14, 2021, 3 p.

(Continued)

*Primary Examiner* — Sarai E Butler
(74) *Attorney, Agent, or Firm* — Cantor Colburn LLP; Teddi Maranzano

(57) ABSTRACT

Embodiments are for using sequential set index to determine the root cause location of software issues and problem verification of the software issues. Fail data for a software program is received. The fail data corresponds to a plurality of failed test cases for the software program. It is determined that at least one model in a plurality of models includes at least one case that matches the fail data of the software, each of the plurality of models having one or more cases, the at least one case being in the one or more cases. It is determined that a root cause of the at least one model corresponds to the plurality of failed test cases for the software program.

20 Claims, 21 Drawing Sheets

(56) References Cited

OTHER PUBLICATIONS

"Introduction to Time Series Regression and Forecasting", SW Chapter 14, https://public.support.unisys.com/aseries/docs/ClearPath-MCP-18.0/86000213-420/section-000019393.html retrieved on Dec. 14, 2021; 99 p.

"Time Series Index (TSI) Overview", InfluxD B OSS 1.8 Documentation, https://docs.influxdata.com/influxdb/v1.8/concepts/time-series-index/ retreived Dec. 16, 2021, 2 pages.

Abstract Only, Jing, "Efficiant Method for time Series Similar Searching", www.cqvip.com vol. 30 No. 9, 2003, 3 pages.

Anonymous, "Assuring software quality by automatic generation of test cases and automatic analysis of test case results for derivation and regression error determination", IPCOM000180300D ip.com, Mar. 6, 2009, 6 pages.

Anonymous, "Method to design and develop intelligent automation test scripts" IPCOM000182832D,ip.com, May 7, 2009, 9 pages.

Anonymous, "System and Method for quick error location based on run time graph in testing automation" IPCOM000202010D, ip.com, Dec. 10, 2010, 8 pages.

Kahles, "Automating Root Cause Analysis via Machine Learning in Agile Software Testing Environments", ResearchGate, 2019 IEEE 12th International Conference on Software Testing, Verification and Validation, ICST, Jun. 2019, 14 p.

Mesidor, "A basic guide to time series analysis", Towards Data Science, Feb. 16, 2019, 10p.

Truong, "Clustering and Classification of Test Failures Using Machine Learning", Master's Thesis | Lund University 2018, 67 p.

\* cited by examiner

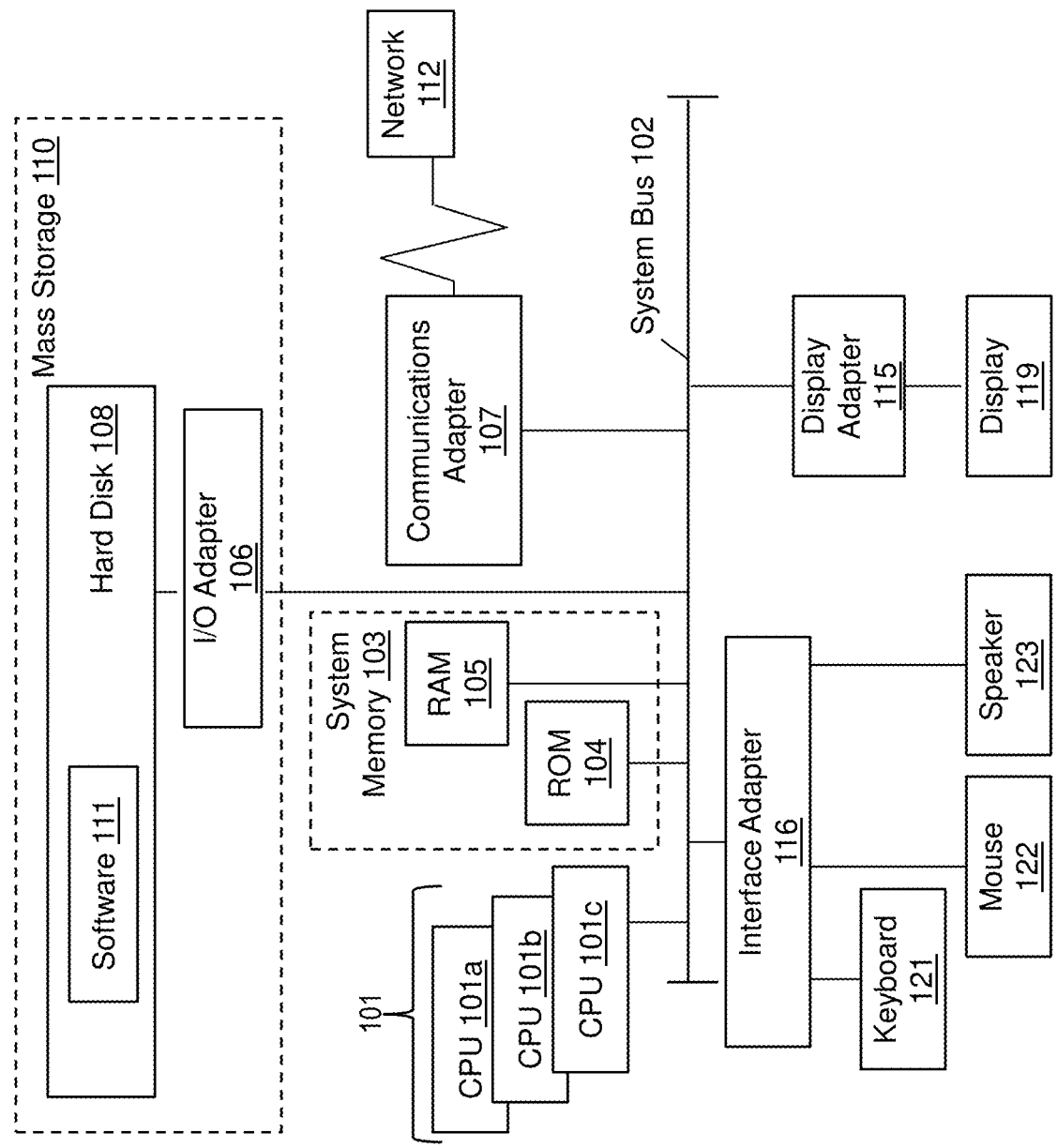

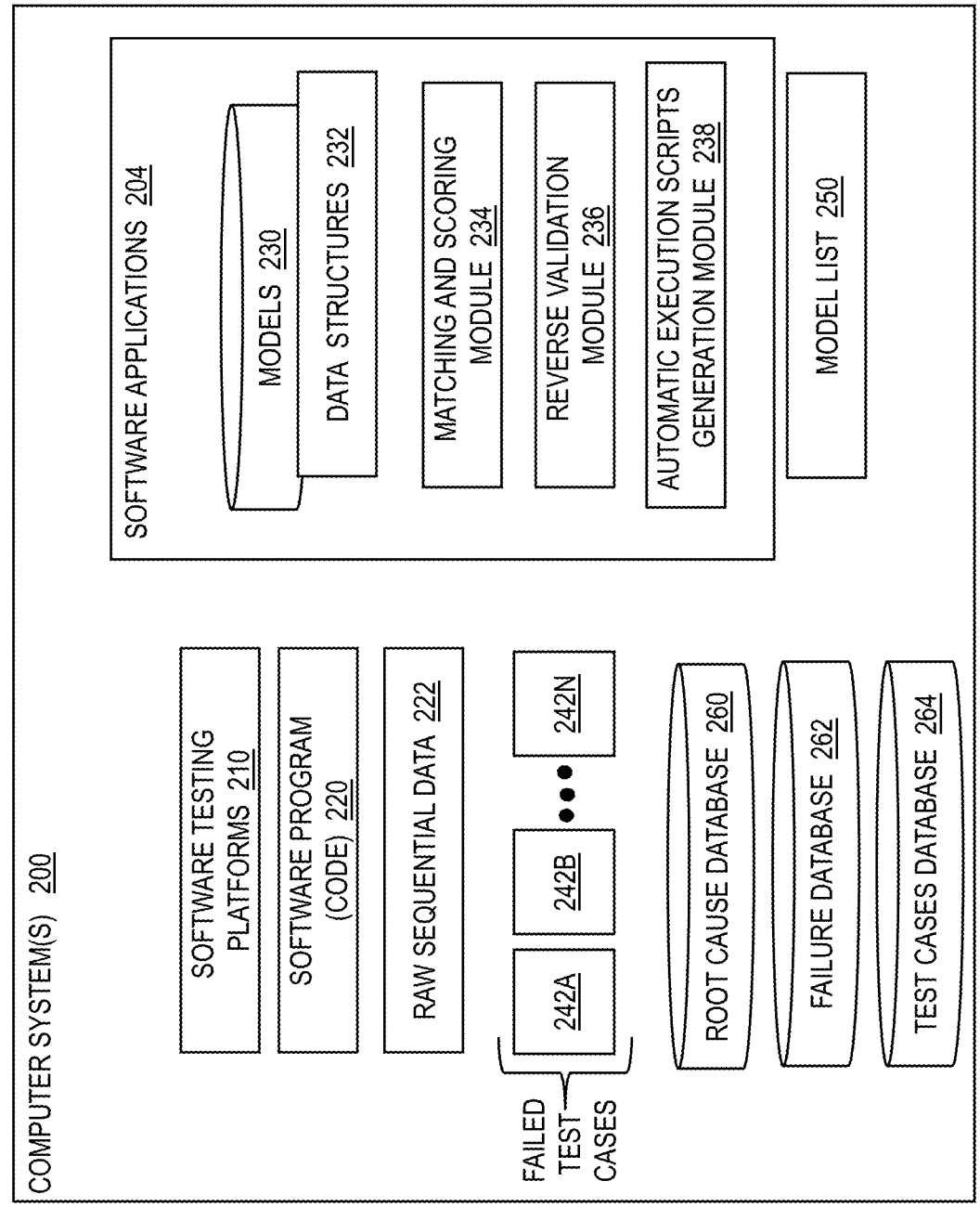

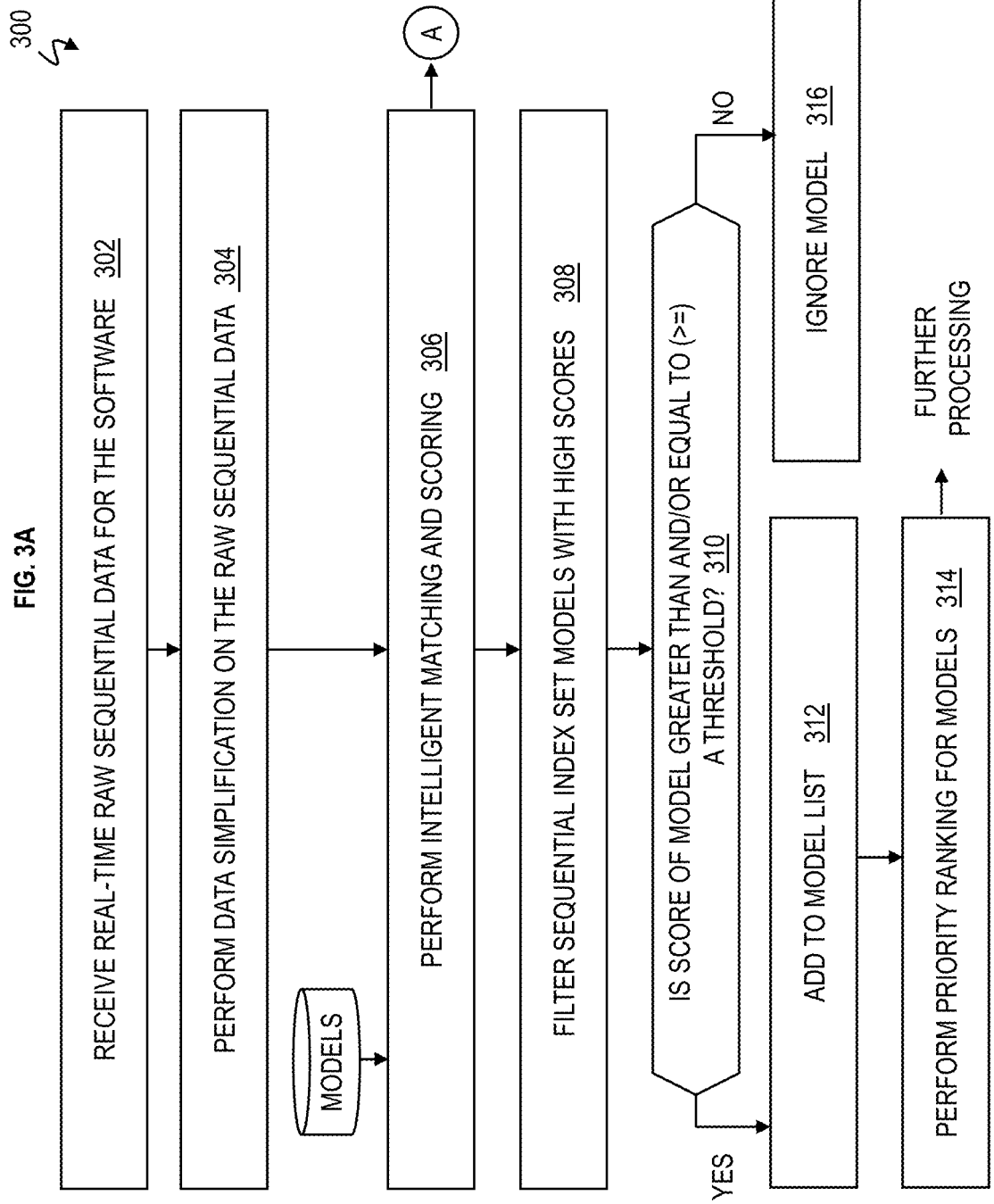

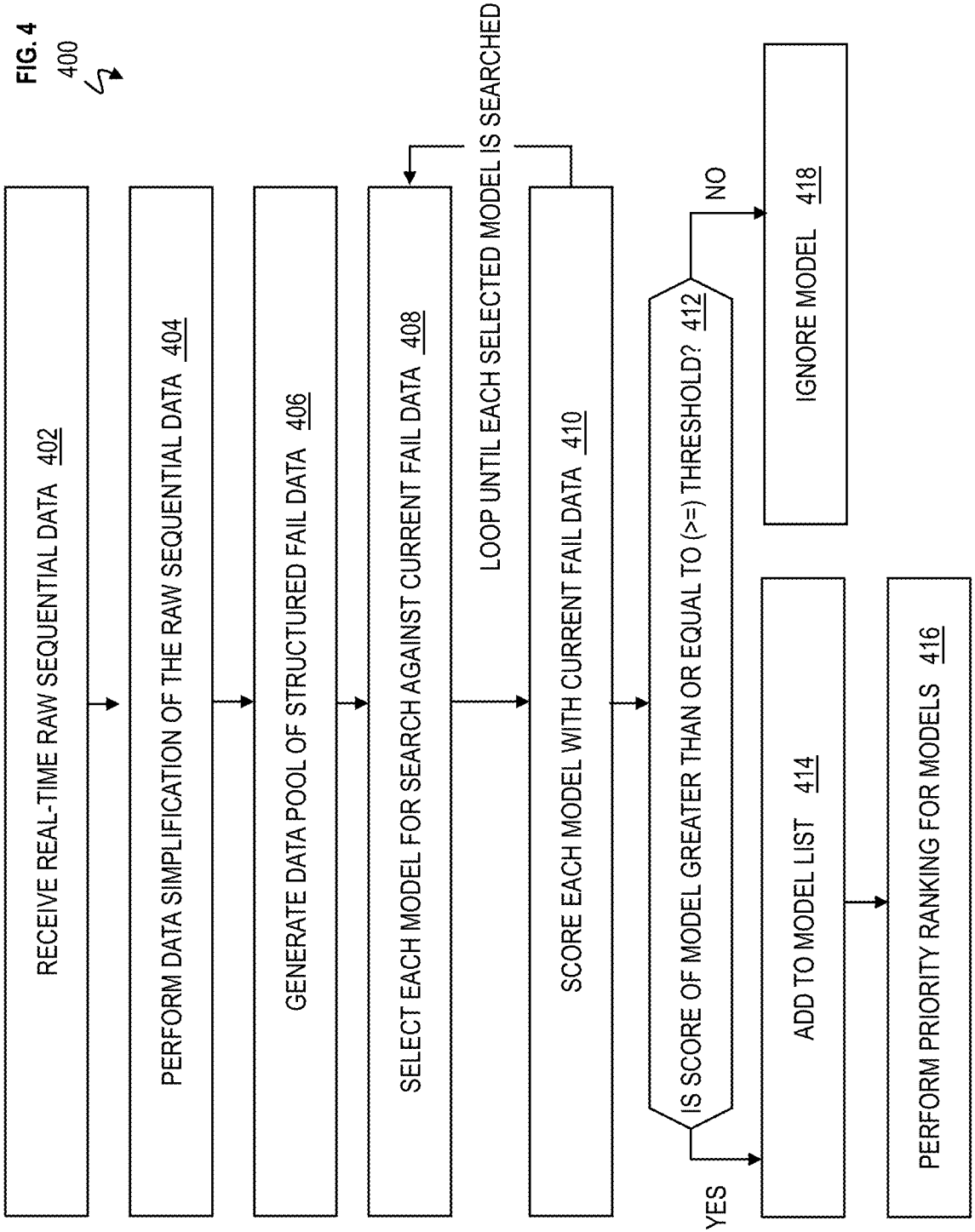

FIG. 6

```
ROOT-CAUSE-NUMBER:{
  (MODELA:{CASE1:(CASE-RELEVANT-START-TIME,[(CASE-RELEVANT-ERROR-TIME:CASE-FAILURE-NUMBER):FAILURE-WEIGHT,(CASE-RELEVANT-ERROR-TIME:CASE- FAILURE-NUMBER):FAILURE-WEIGHT,...]):CASE-WEIGHT,
    CASE2:(CASE-RELEVANT-START-TIME,[(CASE-RELEVANT-ERROR-TIME:CASE-FAILURE-NUMBER):FAILURE-WEIGHT,(CASE-RELEVANT-ERROR-TIME:CASE-FAILURE-NUMBER):FAILURE-WEIGHT,...]):CASE-WEIGHT,
    ...}):MODEL-PROPERTY;
  (MODELB:{CASE1:(CASE-RELEVANT-START-TIME,[(CASE-RELEVANT-ERROR-TIME:CASE-FAILURE-NUMBER):FAILURE-WEIGHT,(CASE-RELEVANT-ERROR-TIME:CASE-FAILURE-NUMBER):FAILURE-WEIGHT,...]):CASE-WEIGHT,
    CASE2:(CASE-RELEVANT-START-TIME,[(CASE-RELEVANT-ERROR-TIME:CASE-FAILURE-NUMBER):FAILURE-WEIGHT,(CASE-RELEVANT-ERROR-TIME:CASE-FAILURE-NUMBER):FAILURE-WEIGHT,...]):CASE-WEIGHT,
    ...}):MODEL-PROPERTY;
  (MODELC:{...}):MODEL-PROPERTY;
  (MODELD:{...}):MODEL-PROPERTY;
  ...
}
```

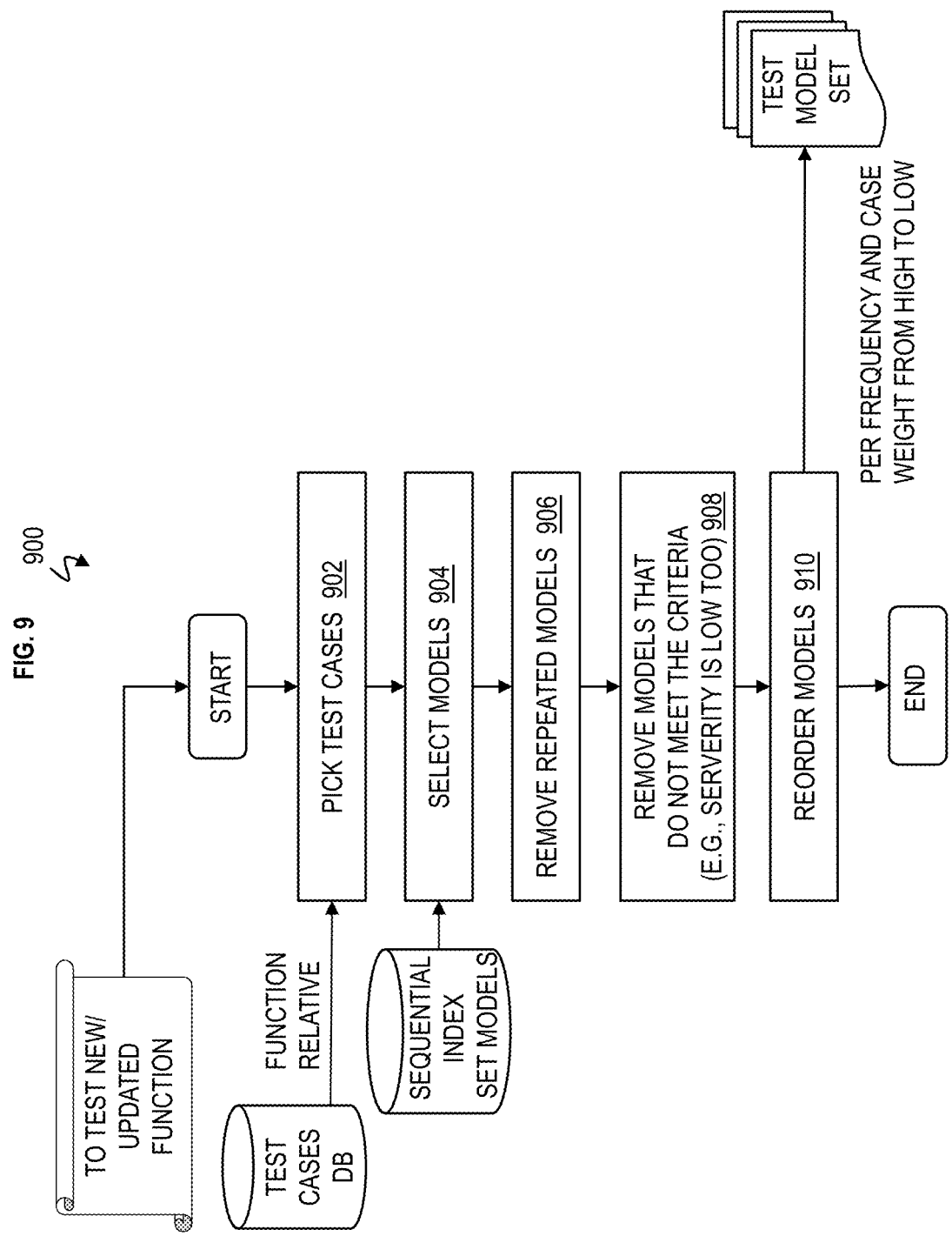

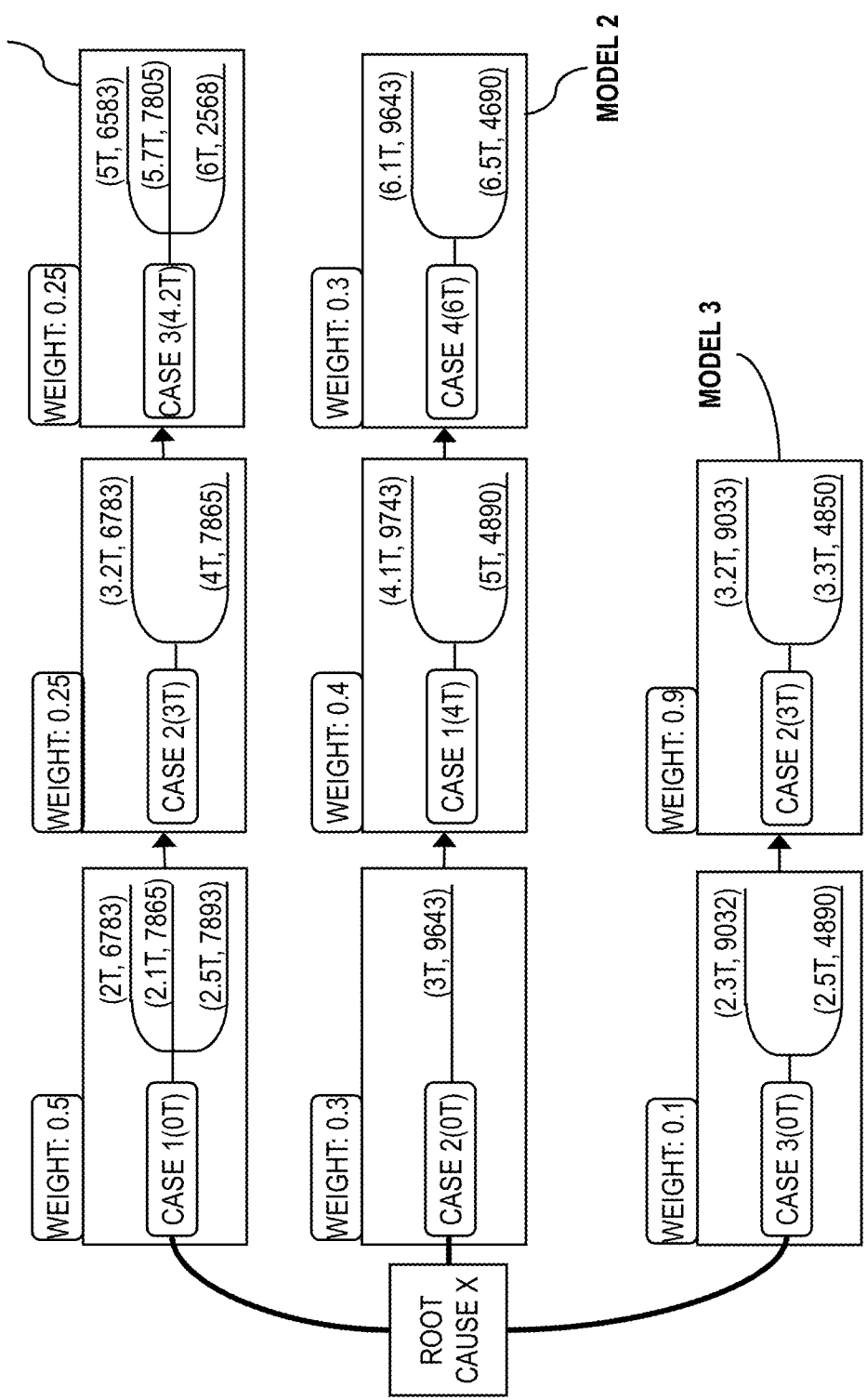

FIG. 12

Root Cause X:{
  model1:{case1(0T,[2T:6783,2.1T:7865,2.5T:7891]):0.5,case2(3T,[3.2T:6783,4T:7865]):0.25,case3(4.2T,[5T:6583,5.7T:7805,6T:2568]):0.25};
  model2:{case2(0T,[3T:9473]):0.3, case1(4T,[4.1T:9473,5T:4890]):0.4, case4(6T,[6.1T:9643],[6.5T:4690]):0.3};
  model3:{case3(0T,[2.3T:9032,2.5T:4890]):0.1, case2(3T,[3.2T:9033,3.3T:4850]):0.9};
}

USE SEQUENTIAL SET INDEX FOR ROOT CAUSE LOCATION AND PROBLEM VERIFICATION

BACKGROUND

The present invention generally relates to computer systems, and more specifically, to computer-implemented methods, computer systems, and computer program products configured and arranged for using sequential set index to determine the root cause location of software issues and perform problem verification of the software issues.

A software bug is an error, flaw, or fault in a computer program or system that causes it to produce an incorrect or unexpected result or to behave in unintended ways when run on a computer system. The process of finding and fixing bugs is termed "debugging" and often uses formal techniques or tools to pinpoint bugs. Most bugs arise from mistakes and errors made in either a program's design or its source code. A program that contains many bugs and/or bugs that seriously interfere with its functionality is said to be buggy (defective). Bugs can trigger errors that may have ripple effects. Bugs may have subtle effects or cause the program to crash or freeze the computer. Other bugs qualify as security bugs and might, for example, enable a malicious user to bypass access controls in order to obtain unauthorized privileges.

When a known issue causes recurring failures across multiple test cases, each failure is analyzed to determine a resolution. A human tester may manually evaluate the failures by examining the results of the test to determine whether the failure is the result of a known incongruity or bug. The failure may then be associated with the appropriate bug report. Manually examining and evaluating each failure is a time intensive process. The tester may see a failure repeatedly, due to an unfixed bug, a known intermittent environmental issue, a product regression, or other causes.

SUMMARY

Embodiments of the present invention are directed to methods for using sequential set index models for finding the root cause location and performing problem verification of software issues. A non-limiting example method includes receiving fail data for a software program, the fail data corresponding to a plurality of failed test cases for the software program. The method includes determining that at least one model in a plurality of models includes at least one case that matches the fail data of the software, each of the plurality of models having one or more cases, the at least one case being in the one or more cases. Also, the method includes determining that a root cause of the at least one model corresponds to the plurality of failed test cases for the software program.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 1 depicts a block diagram of an example computer system for use in conjunction with one or more embodiments of the present invention;

FIG. 2 depicts a block diagram of one or more computer systems for using sequential set index models to determine the root cause location of software issues and perform problem verification for the software issues, thereby debugging software for execution on a computer system according to one or more embodiments of the present invention;

FIGS. 3A, 3B, and 3C are a flowchart of a process for using sequential set index models to determine the root cause location of software issues and perform problem verification of the software issues, in order to fix the root cause of the problem in the software according to one or more embodiments of the present invention;

FIG. 4 is a flowchart of a process illustrating further details for intelligent matching and scoring using sequential set index models to determine the root cause location of software issues and perform problem verification of the software issues, in order to fix the root cause of the problem in the software according to one or more embodiments of the present invention;

FIG. 6 depicts a block diagram of a new data structure for sequential set index models according to one or more embodiments of the present invention;

FIG. 9 is a flow chart of a process illustrating further details for reverse validation in accordance with one or more embodiments of the present invention;

FIG. 11 depicts a block diagram of an example scenario according to one or more embodiments of the present invention;

FIG. 12 illustrates data structures for models in FIG. 11 according to one or more embodiments of the present invention;

DETAILED DESCRIPTION

Figure 3B:
Figure 3C:
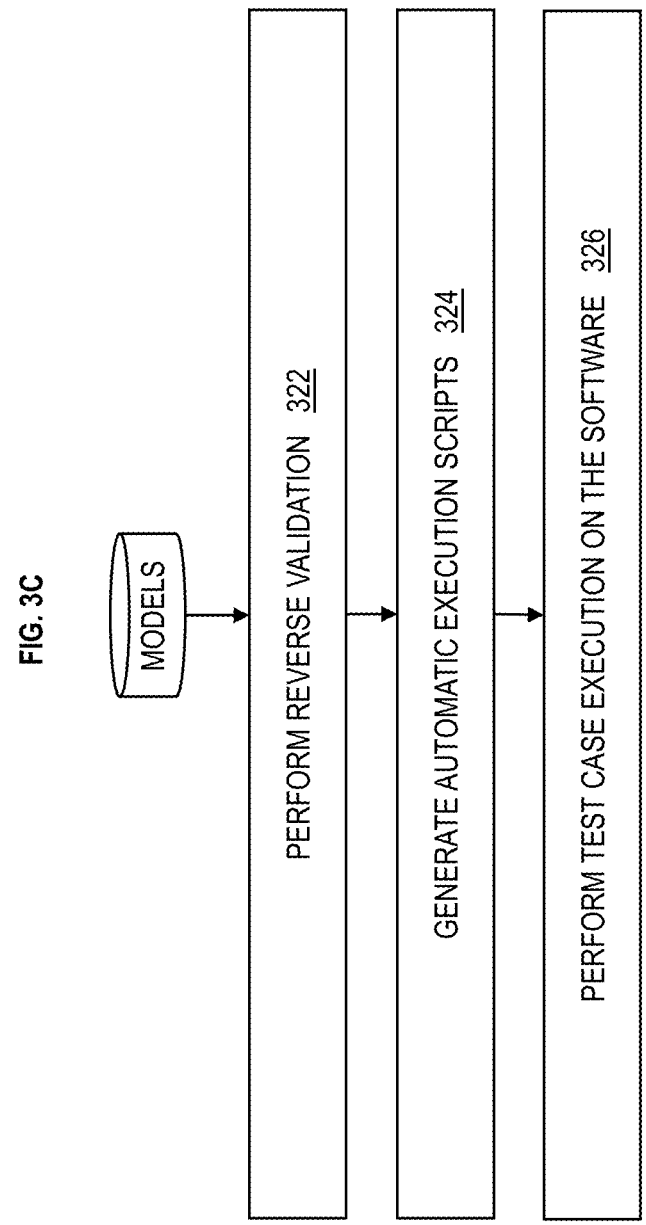

One or more embodiments of the invention are configured for using sequential set index models to quickly locate the root cause of issues and perform problem verification, thereby debugging software for execution on a computer system and improving the functioning of the computer system. One or more embodiments of the invention provide a new technique to classify test cases, organize the test cases into an extensible sequential set with index, and build test models. The test models are built by analyzing and classifying the appearance, root cause, and occurrence sequence of the test cases, along with analyzing and classifying the severity of historical failures of test cases. According to one or more embodiments, the test models are utilized to guide testers to make test plans and quickly identify problems in software which thereby help developers quickly locate root causes and solve problems in software. Accordingly, one or more embodiments provide precision tests to determine the root cause of problems in software, resulting in the resolution of the problem.

It often happens that many failed test cases return different error messages, and the failed test cases with different error messages seem to have no relationship to each other. As such, testers open different issues for the failed test cases, but after developers conduct a deep dive into the code, these issues are identified to be caused by the same root cause, which is a common problem for testers. This extra work conducted by the testers requires extra time, lowers work efficiency, requires extra computing resources (i.e., more processors, memory, bandwidth, etc.).

According to one or more embodiments of the invention, sequential set index models are utilized to quickly locate the root cause of issues in the code of software. Various technical benefits and solutions are provided. One or more embodiments provide techniques to quickly identify issues from failed test cases in a big volume of data (i.e., big data) which greatly improves work efficiency, to improve the efficiency of finding the root cause in software for clients/customers, and to reduce the possibility of serious problems appearing after the launch of the software. Software is configured to run and maintain various functions on computer systems (including servers) which may include sensitive information. Moreover, one or more embodiments of the invention resolve the root cause location problem on computer systems which is a technical solution to a technical problem. Further, by finding the root cause and resolving it, one or more embodiments can help avoid and/or prevent a malicious computer attack or intrusion, a computer security threat, a serious malfunction of software/hardware, a violation of data privacy laws and protections, etc., thereby improving the functioning of a computer system itself as well as multiple computer systems interconnected in a cloud environment, thereby preventing further exposure to the potential problem.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction are discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

FIG. 2 is a block diagram of one or more computer systems 200 for using sequential set index models to determine the root cause location of software issues and perform problem verification for the software issues, thereby debugging software for execution on a computer system and improving the functioning of the computer system according to one or more embodiments of the invention. Elements of computer system 100 may be used in and/or integrated into one or more computer systems 200. Any of the software discussed in computer systems 200 may include and/or may be implemented as software 111 executed on one or more processors 101, as discussed in FIG. 1.

Computer systems 200 may include various types of known software testing platforms 210 for testing software as understood by one of ordinary skill in the art. Software testing is the process of evaluating and verifying that a software product or application does what it is supposed to do. The benefits of testing include preventing bugs, reducing development costs, and improving performance on computer systems. Software program 220 is an example software product that is tested using any of the known software testing platforms 210. Software program 220 may interchangeably be referred to as software, code, software applications, software products, etc.

There are many different types of software tests, each with specific objectives and strategies. Acceptance testing is for verifying whether the whole system works as intended. Integration testing is for ensuring that software components or functions operate together. Unit testing is for validating that each software unit performs as expected. A unit is the smallest testable component of an application. Functional testing is for checking functions by emulating business scenarios, based on functional requirements. Black-box testing is a common way to verify functions. Performance testing is for testing how the software performs under different workloads. Load testing, for example, is used to evaluate performance under real-life load conditions. Regression testing is for checking whether new features break or degrade functionality. Sanity testing can be used to verify menus, functions, and commands at the surface level, when there is no time for a full regression test. Stress testing is for testing how much strain the system can take before it fails and is considered to be a type of non-functional testing. Usability testing is for validating how well a customer can use a system or web application to complete a task.

For regression testers (or other types of testers), there can be a large quantity of failed test cases, such as for example, failed test cases 242A, 242B, through 242N, where N represents the last failed test case as a result of performing software testing for software program 220. For developers, there can be so many issues and defects to address which require an extraordinary amount of time and computing resources.

The failed test cases return different error messages, and the failed test cases with different error messages seem to have no relationship to each other. As such, testers open different issues for the failed test cases; however, after developers conduct a deep dive into the code, these issues are identified to be caused by the same root cause, which is a common problem for testers. One or more embodiments of the invention can utilize software applications 204 to pre-analyze and classify the test case failures, such as the failed test cases 242A-242N to determine a root cause of the issues. The different issues can be different errors and/or error codes for the tested software, and the different issues may appear to be unrelated. Accordingly, software applications 204 may identify the paragraph(s), section(s), and/or lines of code causing the issues in the software program 220, even when the failed test cases do not appear to be related to the same root cause, because software applications have determined the root case. The root cause could be a loop, a call by a function, syntax, the file does not exist, out of memory, an authority problem, etc. Accordingly, software program 220 is corrected to prevent and/or avoid failing the test cases, thereby improving the functioning of a computer system when software program 220 is executed on the computer system. Moreover, software applications 204 prevent the requirement of needing extra computing resources (i.e., more processors, memory, bandwidth, etc.) and time (e.g., days, weeks, months, etc.) to resolve the issues, find the root cause, and locate the root cause. After determining the root cause of the problem in the software program, the tester/developer can then resolve the root cause.

FIGS. 3A and 3B are a flowchart of a process 300 for using sequential set index to determine the root cause location of software issues and problem verification of the software issues, in order to correct the root cause of the problem in the software according to one or more embodiments of the invention. Reference can be made to computer systems 200 in FIG. 2.

At block 302, software applications 204 are configured to receive real-time raw sequential data such as raw sequential data 222. Software testing platforms 210 may run software tests on software program 220 and the output of the software test is raw sequential data 222. The raw sequential data 222 is in a sequence having a starting time and an ending time associated with various errors, after running tests on software program 220.

At block 304, software applications 204 are configured to perform data simplification on the raw sequential data 222. The data simplification organizes and structures the raw sequential data 222 into a format for comparison to sequential set index models 230. The raw sequential data is recorded in a sequence and the organized (raw) sequential data continues to be maintained in sequence, such that the timing of the errors is maintained. The organized (raw) sequential data may also be referred to as fail data, actual data, failed data, failure data, etc. The data simplification is to convert the raw sequential data into the new data structure format. For example, for each error, it has two properties: error code and actual error time. Software applications 204 simplifies the actual error time to relative error time, sets the start time of the case to 0T, and then makes the error time be a relative time of 0T.

The organized sequential data, which is fail data, includes failed test cases, such as failed test cases 242A-242N. The fail data includes the failed test cases 242-242N generated as a result of the software testing platforms 210 running software tests on the software program 220, and no fail data is generated when the software program 220 passes a software test. The failed test cases can generally be referred to as failed test cases 242. Each failed test cases includes an error start time, and an error code.

Figure 8:
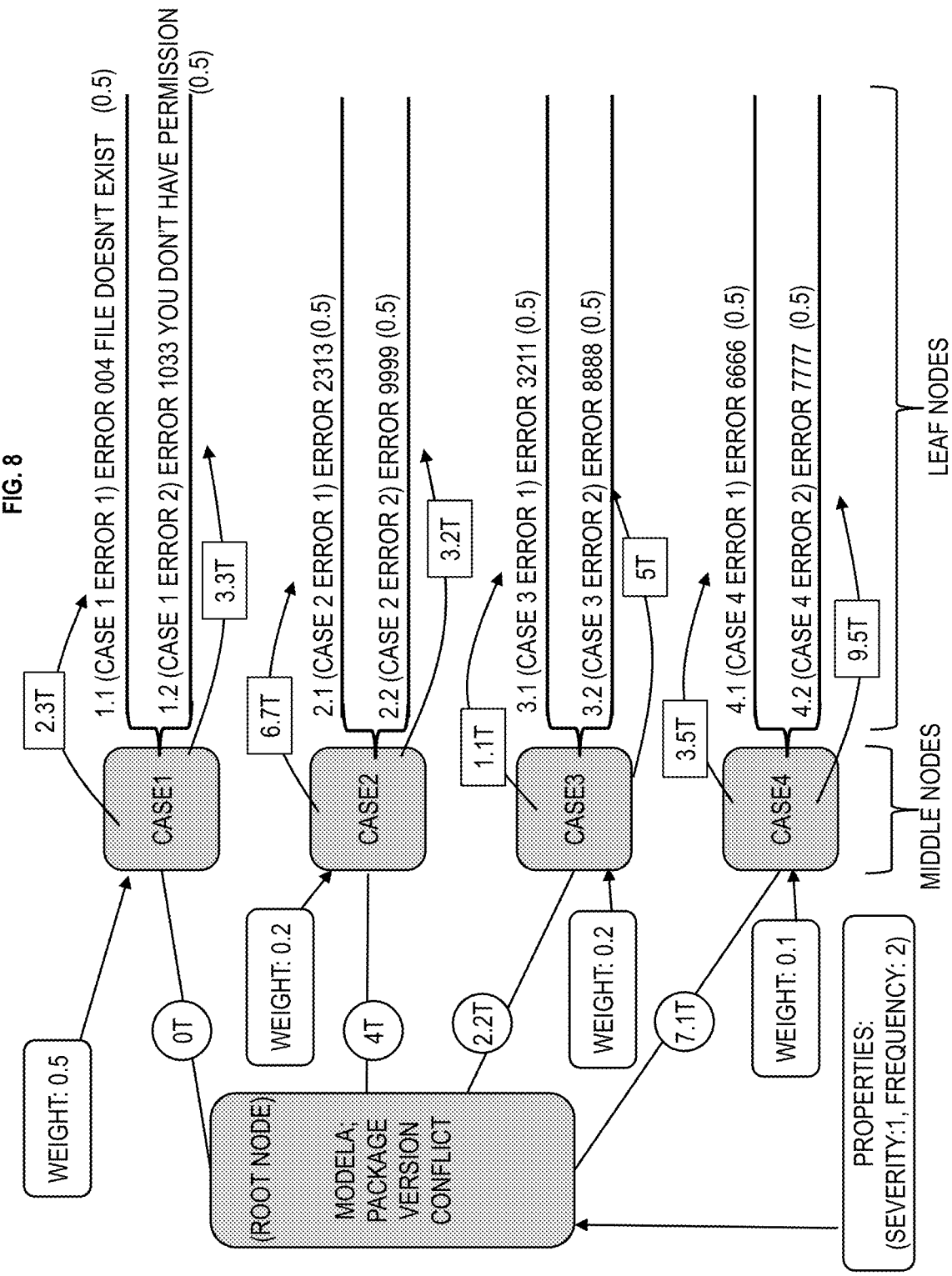
FIG. 8 depicts a block diagram of an example model structure for the sequential set index models according to one or more embodiments of the present invention.

An example sequential set index model is depicted in FIG. 8. The sequential set index model is structured in which model is its root node, case is its middle node, and case execution error is its leaf node. The case-relevant-start-time is the edge between root node and middle node, and the case-relevant-error-time is the edge between the middle node and leaf node. Each node can have properties, where the properties for the root node are root cause, severity, frequency, and so forth. The properties for the middle node are case weight and so forth, and the properties for the leaf node are failure-weight and so forth. The failure-weight is not illustrated in FIG. 8. In some cases, there may not be failure-weight.

Figure 5:
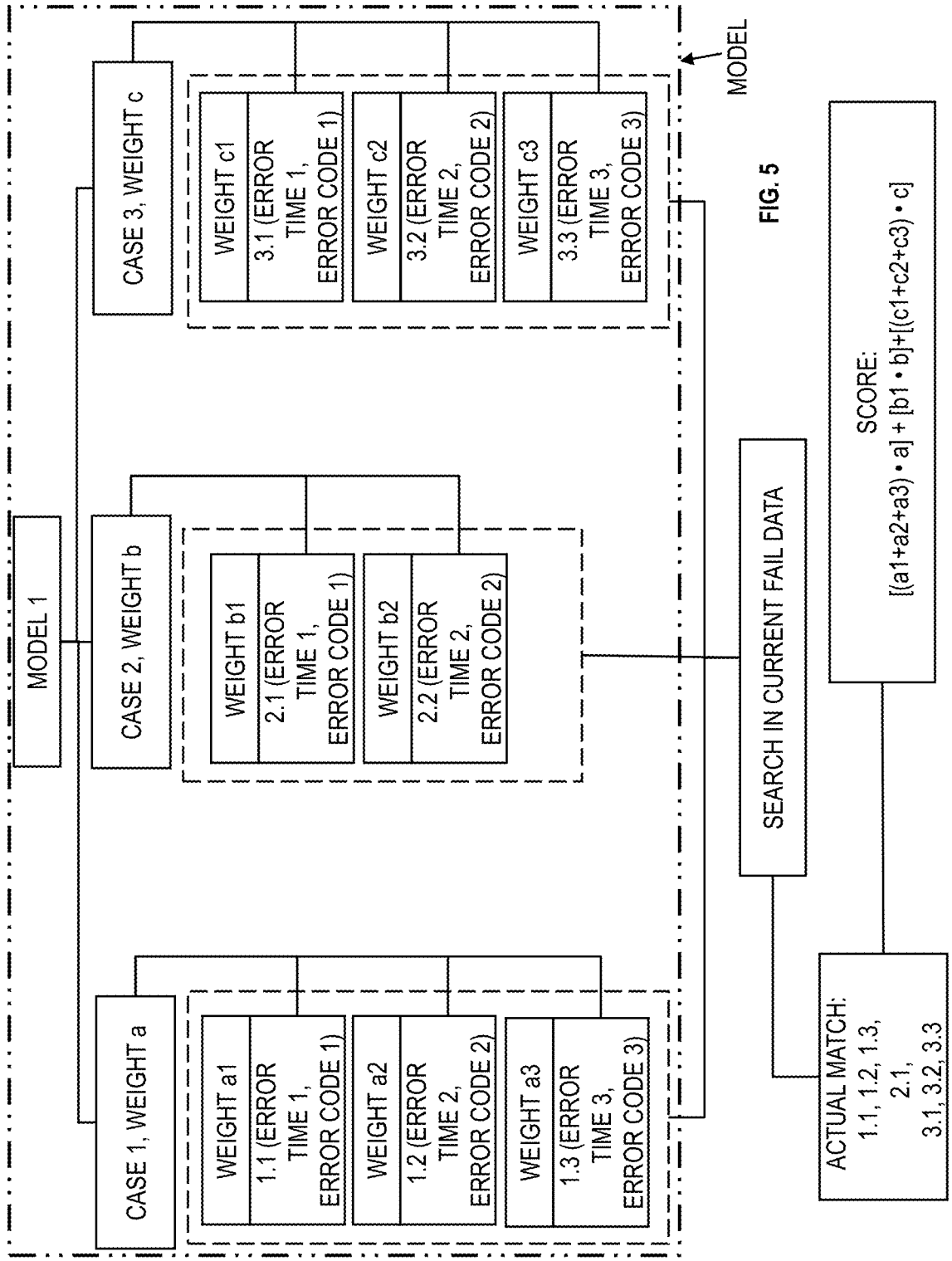
FIG. 5 depicts a block diagram of using intelligent matching and scoring to determine the root cause of software issues, thereby debugging the software according to one or more embodiments of the present invention.

Further, a new data structure (such as data structures 232) is created to store the sequential set index model, which improves the efficiency and enables new capabilities. The data structure 232 for the sequential set index model 230 includes a root-cause-number, a model-property, a case-relevant-start-time (CRST), a case-relevant-error-time (CRET), a case-failure-number, a case-weight part, and a failure-weight part to store the model data. The information stored in data structure 232 for sequential set index model 230 is illustrated in FIG. 5, which is discussed further herein.

At block 306, software applications 204 are configured to perform intelligent matching and scoring. Software applications 204 may include, instruct, and/or cause an intelligent matching and scoring module 234 to perform intelligent matching and scoring. The intelligent matching and scoring module 234 automatically processes the organized (raw) sequential data recorded in sequence in order to match one or more existing sequential set index models 230 and to calculate the matching score between the selected failed test cases 242 and the sequential set index models 230. The failed test cases 242 may be selected according to a time interval. For example, all failed test cases from time X through time Y are selected, where X is less than Y. It is noted that the cases in sequential set index models 230 are maintained in a sequence as well. The intelligent matching and scoring module 234 is configured to generate a final model priority ranking list for later usage. The selected failed test cases 242 can be predetermined in advance. Each of the sequential set index models 230 has cases (e.g., case 1, case 2, case 3) that are compared against the selected failed test cases 242 of the organized sequential data and scored for a match. When there is a match, the selected failed test cases 242 can be tagged to its corresponding sequential set index model 230. Any failed test cases that are not tagged can be further processed at block 318 as discussed herein.

At block 308, software applications 204 (e.g., via intelligent matching and scoring module 234) are configured to filter (i.e., select) the sequential set index models 230 with high scores. The high scores may be selected based on a predetermined rule, for example, scores in the top 10%, 25%, 30%, 40%, and/or 50% (or more) may be selected.

At block 310, software applications 204 (e.g., via intelligent matching and scoring module 234) are configured to check if the score of a sequential set index model 230 is greater than and/or equal to (>=) a threshold. The threshold is a value determined in advance. Examples threshold values for the score may include 0.5, 0.6, 0.7, 0.8, 0.9, etc., where 1 is the maximum value. Each of the filtered sequential set index models 230 are checked.

At block 316, if (No) the score of a given sequential set index model 230 is not greater than and/or equal to the threshold, software applications 204 are configured to ignore that sequential set index model 230. In other words, that sequential set index model 230 will not be utilized for subsequent processes related to software program 220.

At block 312, if (Yes) the score of a given sequential set index model 230 is greater than and/or equal to the threshold, software applications 204 are configured to add the given sequential set index model 230 to a model list 250 corresponding to the software program 220 having the selected failed test cases 242.

At block 314, software applications 204 are configured to prioritize/rank the sequential set index models 230 in the model list 250. The sequential set index models 230 may be ranked from highest score to lowest score. At this point, the software applications 204 are configured to determine that the root cause of the issues for software program 220 is the same root cause for the highest ranked sequential set index model 230 and/or the top ranked sequential set index models 230. Accordingly, the debuggers or developers can use the determined location of the root cause to fix the issues in the software program 220. Moreover, the debuggers or developers can take advantage of the (priority ranking) model list 250 for further root cause location. For ranking from highest score to lowest score, any desired percentile of models in the model list 250 can be utilized, for example, top 5%, 10%, 15%, 25%, etc. In some cases, one or more sequential set index models 230 in the model list 250 can have the same root cause, further confirming that the failed test cases 242 of software program 220 occurred because of the identified root cause. Software applications 204 can look up the root-cause-number in the root cause database 260 to find a summary of the solution to the root cause, thereby allowing the solution to be applied for the various issues (which may seem unrelated) to the software program 220. In one or more embodiments, software applications 204 can scan the software program 220 to find the location of the root cause based on the solution.

At block 318, software applications 204 are configured to process the remaining organized sequential data that did not match any of the existing sequential set index models 230. In other words, the remaining failed test cases 242 are test cases that did not have a tag to a corresponding existing sequential set index model 230.

At block 320, software applications 204 are configured to create new sequential set index models for the remaining failed test cases, and the new sequential index set models can be added to the model list 250 for software program 220 and to the database of sequential set index models 230. Any existing or known technique may be utilized to create new models for the remaining failed test cases as understood by one of ordinary skill in the art.

At block 322, software applications 204 are configured to perform reverse validation. Software applications 204 may include, instruct, and/or cause a reverse validation module 236 to perform reverse validation services. The reverse validation module 236 is configured to filter (select) cases from a test cases database 264 to match/correspond to a new function and/or modified function. The reverse validation module 236 is configured to filter (select) the corresponding sequential set index models 230 from the time series index model set, where the corresponding sequential set index models 230 include the selected test cases from the test cases database 264. The time series index model set can be called the sequential set index model set where the index has time series added to it. The time series index model is provided in advance. The time series index model set may be the model list 250.

At block 324, software applications 204 are configured to generate automatic execution scripts for execution by software program 220. Software applications 204 may include, instruct, and/or cause an automatic execution scripts generation module 238 to generate the automatic execution scripts. Automatic execution scripts generation module 238 is configured to arrange the execution logic of the test cases from the test cases database 264 according the sequential set index models 230.

At block 326, software applications 204 are configured to perform test case execution on the software program 220 and/or cause the software testing platforms to perform execute the selected test cases from test cases database 264 that correspond to the sequential set index models 230. The test cases can be utilized to cause the software program 220 to replicate the failed test cases (i.e., repeat the failure(s)), which then confirms the root cause. In some cases, the software program 220 may have been corrected, and the test cases can be executed by software program 220 to confirm or check that the correction to the software program 220 solved the root cause of the problem.

FIG. 4 is a flowchart of a process 400 illustrating further details for intelligent matching and scoring using sequential set index models to determine the root cause location of software issues and perform problem verification of the software issues, in order to correct the root cause of the problem in the software according to one or more embodiments of the invention.

At block 402 (analogous to block 302 discussed herein), software applications 204 are configured to receive the real-time raw sequential data such as raw sequential data 222. At block 404 (analogous to block 304 discussed herein), software applications 204 are configured to perform data simplification on the raw sequential data 222. The data simplification organizes and structures raw sequential data 222 into a format for comparison to sequential set index models 230, while maintaining the time sequence of the raw data.

At block 406, software applications 204 are configured to generate a data pool of structured fail (raw) data which will be compared against the existing sequential set index models 230.

At block 408 (analogous to block 306 discussed herein), software applications 204 are configured to select a given sequential set index model 230 and search/compare the given sequential set index model 230 to the organized/structured (raw) sequential data in the data pool.

At block 410 (analogous to block 306 discussed herein), software applications 204 (e.g., via intelligent matching and scoring module 234) are configured to score each sequential set index model 230 against the organized/structured (raw) sequential data (i.e., fail data). As noted herein, each case (e.g., case 1, case 2, case 3, etc.) of the sequential set index models 230 is compared against the selected failed test cases 242 of the organized/structured sequential data and scored for a match. When there is a match, the selected failed test cases 242 of the organized/structured sequential data can be tagged to its corresponding sequential set index model 230. If there is not match, the particular sequential set index model can be ignored. The operations in blocks 408 and 410 repeat until each sequential set index model 230 is processed.

The operations of blocks 412, 414, 416 are analogous to blocks 310, 312, 314. Accordingly, the discussion of blocks 412, 414, 416 is not repeated. Similarly, the operation of block 418 is analogous to block 316, and the discussion of block 418 is not repeated. It is noted that for each model that has a score greater than and/or equal to the threshold the sequential set index model 230 and its root cause are added to the model list 250 (or library).

FIG. 5 depicts a block diagram of using intelligent matching and scoring to determine the root cause of software issues, thereby debugging software according to one or more embodiments of the invention. FIG. 5 illustrates an example model which is depicted at model 1. Model 1 has cases which are case 1, case 2, case 3, where each case has a weight. Cases 1, 2, 3 have weights a, b, c, respectively. Each case has error points or subcases. For example, case 1 has error points 1.1, 1.2, 1.3, case 2 has error points 2.1, 2.2, and case 3 has error points 3.1, 3.2, 3.3. Each error point has an error time and error code, and the error point has a weight (i.e., failure-weight). For example, for case 1, error point 1.1 (or subcase 1.1) has error time 1 and error code 1, along with an associated weight a1. Also, for case 1, error point 1.2 (or subcase 1.2) has error time 2 and error code 2, along with an associated weight a2. Likewise, for case 1, error point 1.3 (or subcase 1.3) has error time 3 and error code 3, along with an associated weight a3. For case 1, error time 1 is before error time 2, error time 2 is before error time 3, thereby having a time sequence.

Each case (e.g., cases 1, 2, 3) in sequential set index model 230 is searched in the organized/structured sequential data (i.e., fail data) to determine an actual match. In FIG. 5, the matches to the organized/structured sequential data (i.e., fail data) are error points 1.1, 1.2, 1.3 in case 1, error point 2.1 in case 2, and error points 3.1, 3.2, 3.3 in case 3. After the cases in model 1 have been matched to the organized/ structured sequential data (i.e., fail data), the score for the model (e.g., model 1) is determined by adding the weights for the matching error points in a given case together to obtain a sum and then multiplying the sum by the weight of the given case, thereby obtaining a value for that given case. This process occurs for each matching case and then the value of each matched case is summed to obtain the total score for the model. In FIG. 5, there are matches in cases 1, 2, 3 to the organized/structured sequential data (i.e., the failed test cases have been matched to the cases in model 1) as noted above for matched error points 1.1, 1.2, 1.3, 2.1, 3.1, 3.2, 3.3 which results in the following score for model 1: $[(a1+a2+a3)\cdot a]+[b1\cdot b]+[(c1+c2+c3)\cdot c]$. The following is noted: $a+b+c=1$; $a1+a2+a3=1$; $b1+b2=1$; and $c1+c2+c3=1$.

FIG. 6 depicts a block diagram of the new data structure such as data structures 232 for sequential set index models 230 according to one or more embodiments of the invention. One or more sequential set index models 230 can each have the same root cause. Accordingly, if the organized/structured sequential data (i.e., fail data) from testing software program 220 matches any of the cases in sequential set index models 230, then it is determined that the software program 220 has the same root cause as the matched sequential set index models 230. As such, the same solution or fix identified for the matched sequential set index models 230 can be applied to software program 220, and/or the location of the root cause can be determined in software program 220 such that the root cause of the problem can be fixed.

FIG. 6 illustrates example sequential set index models 230 as model A, model B, model C, and model D. In the data structure, the root-cause-number can be looked up for details in the root cause database 260, and the case-failure-number can be looked up for details in a failure database 262. The root cause database 260 is created to store the root cause summary and details, and each root case has a unique number in the database. The failure database 262 is created to store the failure summary and details, and each failure has a unique failure number in the database. The model-property is to set the properties for the model. Examples of the model-property include frequency value, a severity value, etc.

In data structure 232, the case-relevant-start-time (CRST) is the relevant start time of the particular case. Software applications 204 are configured to treat the first failed case's case-relevant-start-time as zero T (0T). Here, "T" is the time unit, which can be seconds, minutes, and so forth. In data structure 232, the case-relevant-error-time (CRET) is the relevant time the case began to fail compared with the case's case-relevant-start-time. The case-weight is (CW) to indicate the importance of the case in its particular model that the case is inside. Examples of case-weights are the weights a, b, c for cases 1, 2, 3 respectively in FIG. 5. The failure-weight is (FW) to indicate the importance of the failure in the given case the failure is inside. Examples of failure-weights for case 1 are the weights a1, a2, a3 in FIG. 5. In FIG. 6, several sequential set index models 230 are illustrated with the same root cause. In some cases, there can be some sequential set index models 230 that have a different root cause.

Figure 7:
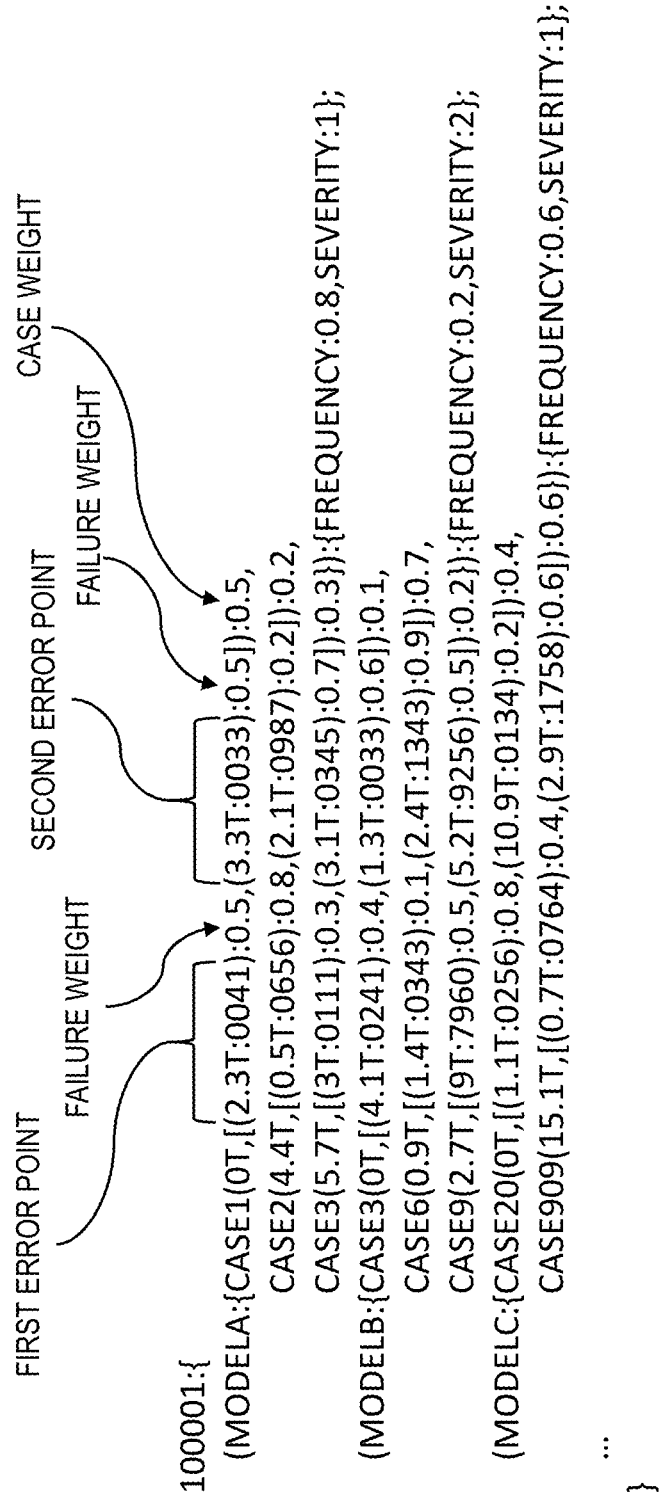
FIG. 7 depicts a block diagram of a new data structure for sequential set index models according to one or more embodiments of the present invention.

FIG. 7 depicts a block diagram of the new data structure for sequential set index models 230 according to one or more embodiments of the invention. In FIG. 7, the data structure such as data structure 232 is illustrated with some example values. Also, the failure-weight is the same in this example scenario.

Taking model A as an example in FIG. 7, case 1 has the case-relevant-start-time of 0T, the case-relevant-error-time of 2.3T (e.g., error time 1 in FIG. 5), case-failure-number of 0041 (e.g., error code 1 in FIG. 5), and the failure-weight of 0.5 (e.g., weight a1 in FIG. 5) for the first error point (i.e., subcase). Also, case 1 has the case-relevant-start-time of 0T, the case-relevant-error-time of 3.3T (e.g., error time 2 in FIG. 5), the case-failure-number of 0033 (e.g., error code 2 in FIG. 5), and the failure-weight of 0.5 (e.g., weight a2 in FIG. 5) for the second error point (i.e., subcase). Model A also has cases 2 and 3 as illustrated in FIG. 7 using an analogous format to case 1. For model A, the model-properties are the frequency and severity, where the frequency is 0.8 and the severity is 1. The maximum value of a model-property is 1. As can be seen, both values for the frequency and severity of model A are high (e.g., high may be 0.6 and above). Software applications 204 are configured to determine that the organized/structured sequential data (i.e., fail data) from testing software program 220 matches model A (and/or models B and C), and the score of model A meets and/or exceeds the threshold value. Particularly, the failed test cases 242 match cases 1, 2, 3 of model A. Accordingly, software applications 204 determine that the matched failed test cases 242 for software program 220 have the same root cause as model A, where the root-cause-number is 100001. Software applications 204 can look up the root-cause-number in the root cause database 260 to determine what is the root cause of the failed test cases for software program 220 and to resolve the root case as identified in the root cause database 260.

FIG. 8 depicts a block diagram of an example model structure for the sequential set index models 230 according to one or more embodiments of the invention. History data of failed test cases can be analyzed to form different models, such as model A in FIG. 8. As seen in FIG. 8, each model has one root cause, several cases (e.g., cases 1, 2, 3, 4), and the bottom layer is the failure number for the cases and the failure sequences among them. The following is the data structure for the example model A in FIG. 8: root-cause-number:{modelA:{case1(0T, [(2.3T:0041):0.5, (3.3T:1033):0.5]):0.5, case2(4T, [(6.7T:2313):0.5, (3.2T:999):0.5]):0.2, . . . }; modelB:{ . . . }; modelC:{ . . . }; . . . }. It is noted that if no failure-weight is given, the failure-weight will be assigned the default average value which is calculated by dividing "1" by the failure numbers in a specific case. The default average value will be used as the default failure-weight.

FIG. 9 is a flow chart of a process 900 illustrating further details for reverse validation using, for example, the reverse validation module 236 according to one or more embodiments of the invention. Software program 220 may have an updated function and/or new function added, and reverse validation module 236 can be used to generate test cases to test the updated function/new function and/or to replicate a problem that was previously experienced by software program 220.

At block 902, reverse validation module 236 is configured to select test cases from test cases database 264. For example, the reverse validation module 236 can select test cases from test cases database 264 based on the test cases being related to the updated function/new function in software program 220. One or more existing methods understood by one having ordinary skill in the art can be used to select the related direct or indirect functions which are related to the updated or new functions mentioned. In one or more embodiments, the related functions and its related test cases can be from the existing unit test (UT), functional verification test (FVT), system verification test (SVT) and other test scopes to select the related test cases.

At block 904, reverse validation module 236 is configured to select models from the sequential set index models 230. The reverse validation module 236 may select sequential set index models 230 from the model list 250 based on the models containing these types of cases.

At block 906, reverse validation module 236 is configured to remove repeated models. At block 908, reverse validation module 236 is configured to remove any sequential set index models 230 that do not meet predetermined criteria. For example, the criteria may be to have a severity value that meets a threshold, have a frequency value that meets a threshold, etc. In this example, any sequential set index models 230 that have a severity below the threshold are removed (e.g., below a severity value of 0.4).

At block 910, reverse validation module 236 is configured to reorder the sequential set index models 230 and output the test model set. The models can be ranked. For example, the sequential set index models 230 can be reordered per frequency and/or case weight from high to low.

Figure 10A:
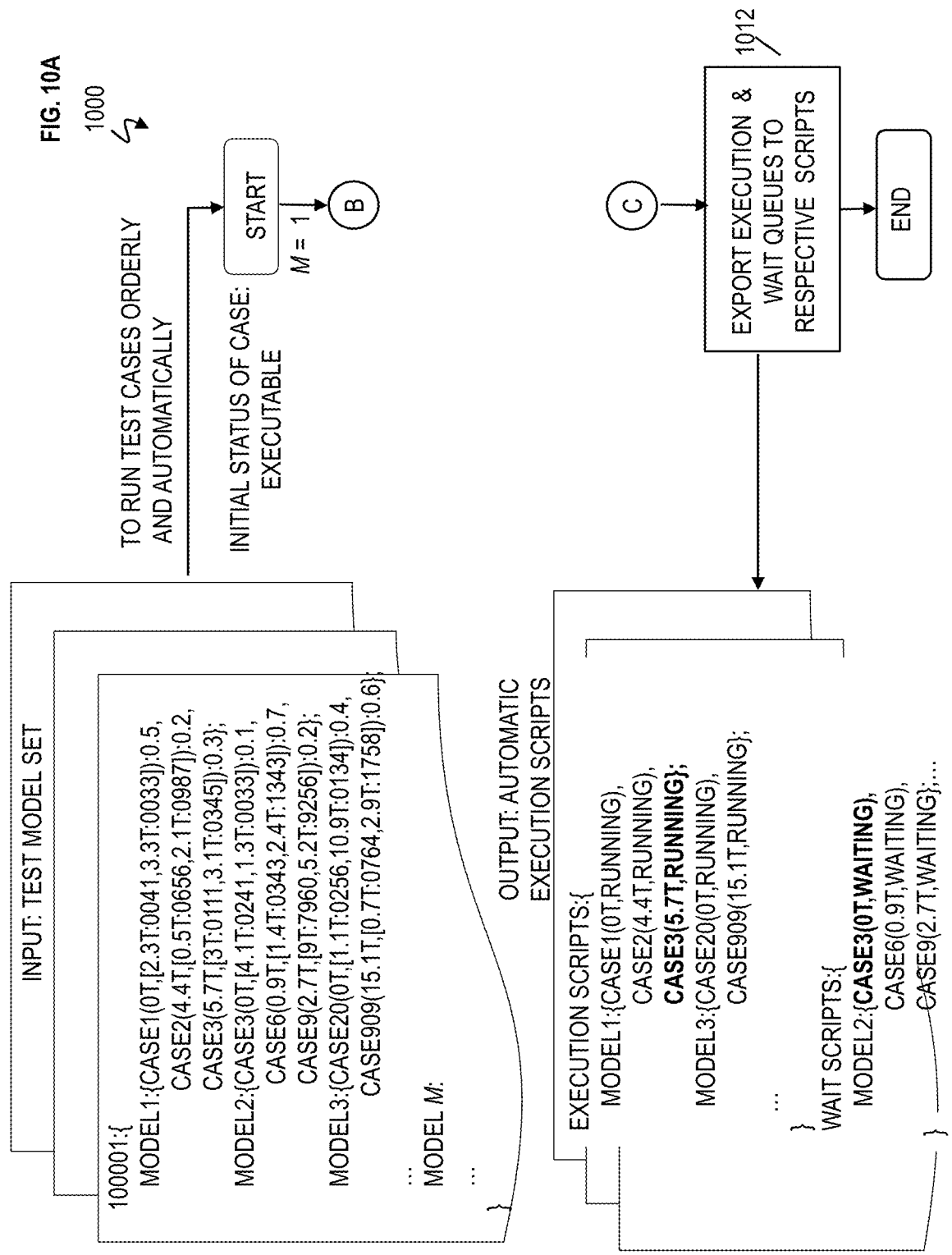
FIGS. 10A and 10B are a flow chart of a process illustrating further details for automatic execution scripts generation according to one or more embodiments of the present invention.
Figure 10B:
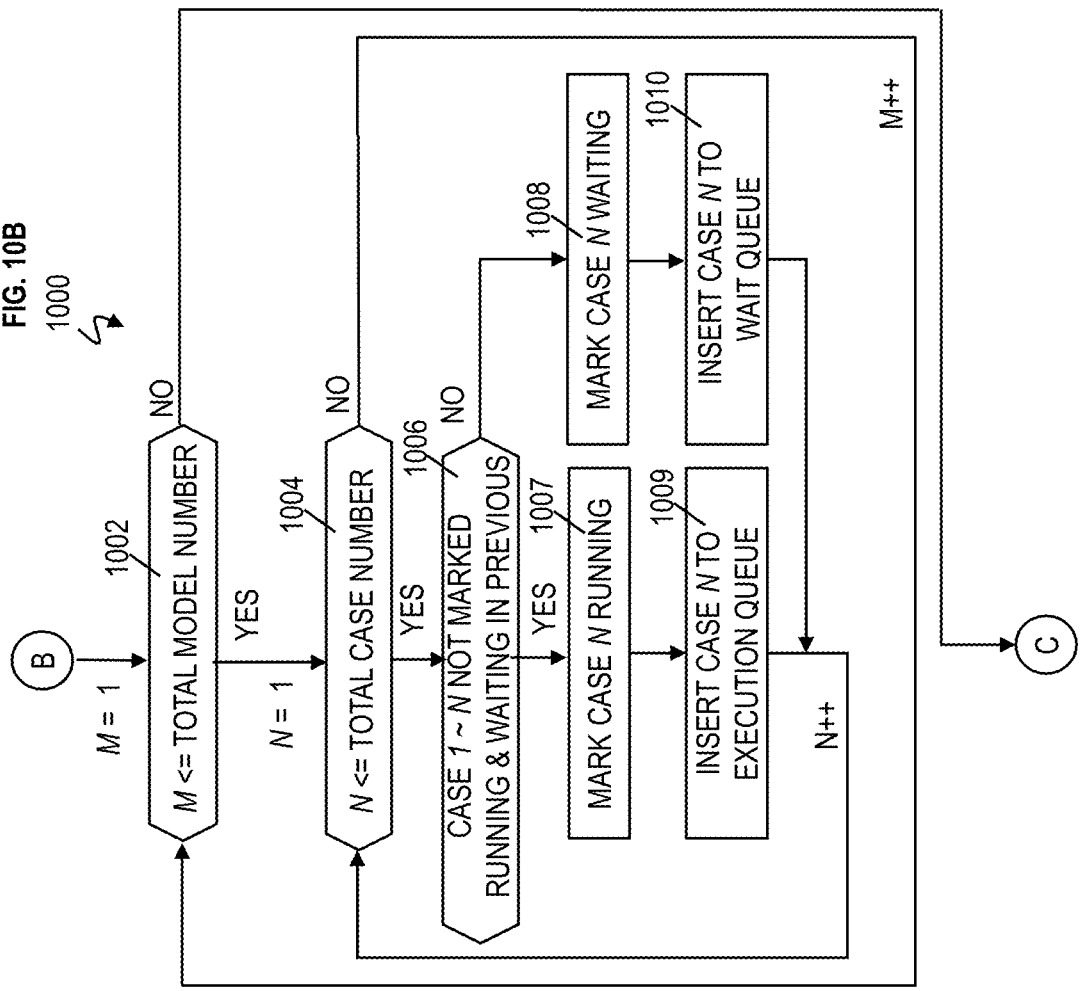

FIGS. 10A and 10B are a flow chart of a process 1000 illustrating further details for automatic execution scripts generation using, for example, the automatic execution scripts generation module 238 according to one or more embodiments of the invention. The test model set of sequential set index models 230 is used as input to the automatic execution scripts generation module 238. At block 1002, automatic execution scripts generation module 238 is configured to check if the current model number M is greater than the total model number, where the value of M is initialized at the onset to 1. If the current model M is greater than the total model number, the flow proceeds to block 1012. At block 1004, if the current model number M is not greater than the total model number, the automatic execution scripts generation module 238 is configured to check if the current case number N is greater than the total case number of the model, where the value of N is initialized at the onset to 1. If the current case number N is greater than the total case number of the model, the value of M is increased by 1 (or incremented) and flow proceeds to block 1002. If the current case number N is not greater than the total case number of the model, flow proceeds to block 1006.

The cases in the automatic execution scripts have 4 types of statuses: executable (initial), running, waiting, and done. At block 1006, automatic execution scripts generation module 238 is configured to check if any case in the current model has not been marked as "running" or "waiting" in previous models. If "Yes", then the cases in the current model will be marked as "running" and pushed to execution queue at blocks 1007, 1009, or else these cases in current model will be marked as "waiting" and pushed to the wait queue at blocks 1008, 1010. The value of N is incremented by 1. When the whole input test model set has been traversed, the execution queue and wait queue will be exported to respective scripts, which are execution scripts and wait scripts, at block 1012. The cases in execution scripts with "running" status will be automatically executed according to their relative start times; the execution scripts can be dynamically updated. When one case in some model is finished, the status of this case will be updated to "done". Accordingly, the software application 204 will be checking the status change in the execution scripts and update the case status in wait scripts. When the statuses of all the cases for a model in the waiting scripts are updated to "running", then this model will be moved to execution scripts. This is done to prevent entering deadlocks and infinite waiting status.

FIG. 11 depicts a block diagram of an example scenario according to one or more embodiments of the invention.

FIG. 12 illustrates the data structures for models 1, 2, 3 in FIG. 11 according to one or more embodiments. In a customer site, when a problem is encountered, the root cause needs to be quickly located for urgent and quick repair. Also, in the process of development and testing, when a test case fails, it is beneficial to quickly locate the root cause, so as to improve the debugging efficiency for developers or debuggers. In FIGS. 11 and 12, the models each have the example root cause X. If the cases (including error points) in any of the models 1, 2, 3 match the failed test cases for software program 220, then the software program 220 has the same root cause X as the matching models.

Figure 13:
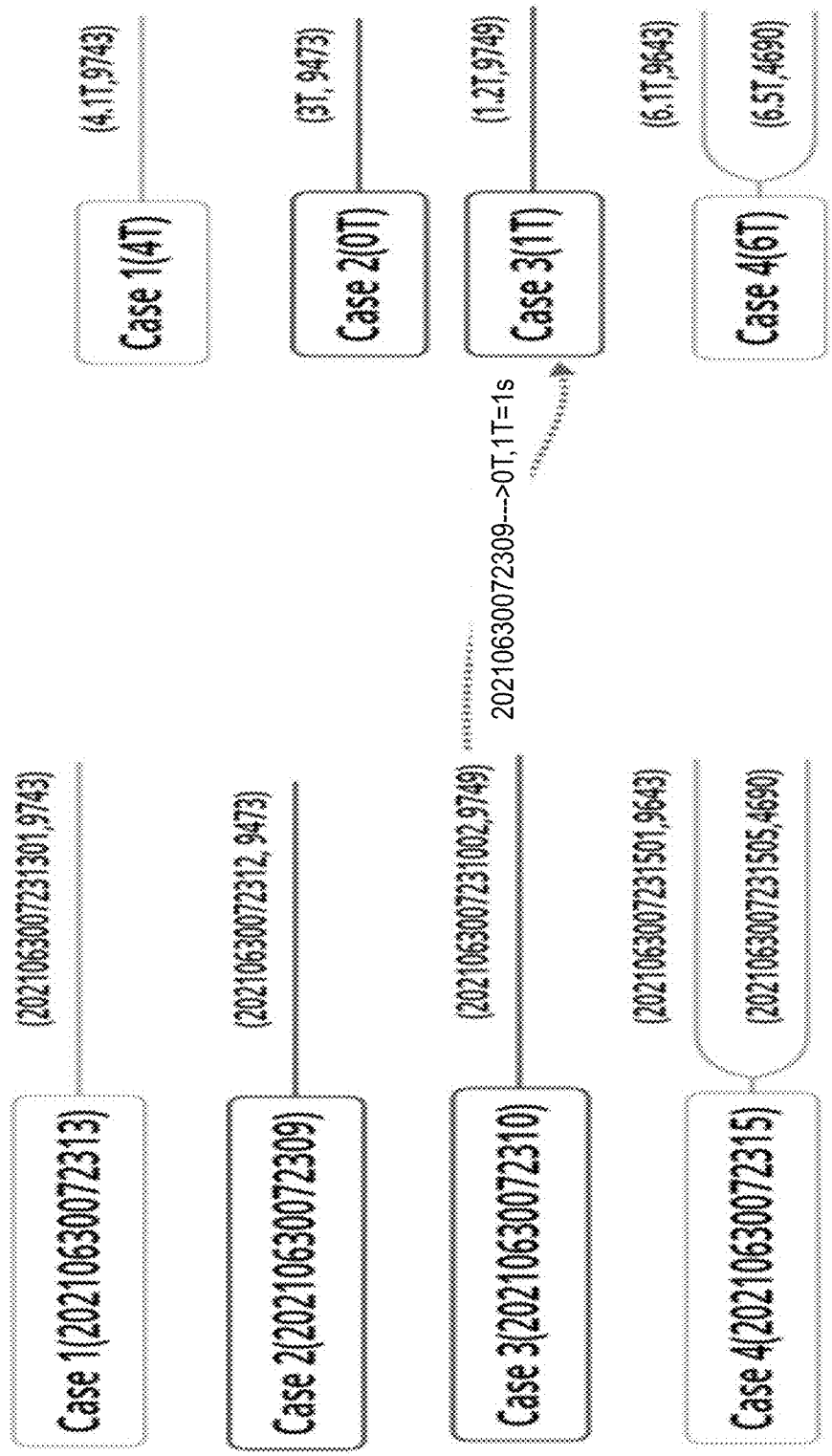
FIG. 13 depicts a block diagram of an example scenario according to one or more embodiments of the present invention.

FIG. 13 depicts a block diagram of an example scenario according to one or more embodiments of the invention. After a set of tests for software program 220, there are four cases with errors, namely case 1, case 2, case 3, and case 4. The extraction of the start time and error time for each case can be simplified as illustrated in FIG. 13 such that the failed test cases 242 can be easily compared to cases in the sequential set index model 230. In other words, the raw sequential data 222 is organized or formatted into organized/structured sequential data. Moreover, FIG. 13 illustrates how raw data is simplified to the format of the data structure for later usage.

Figure 14:
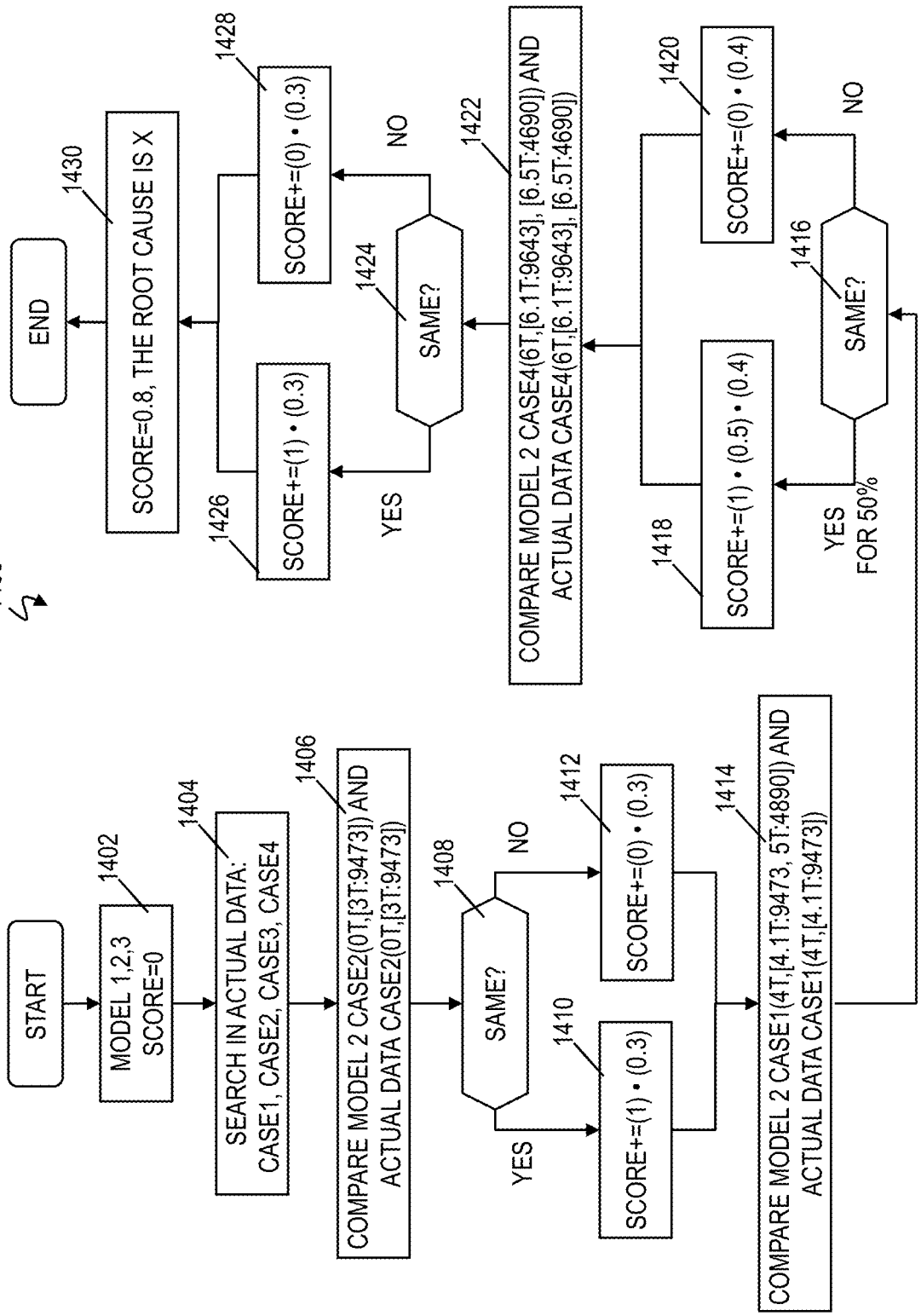
FIG. 14 is a flow chart of a process for model matching and scoring according to one or more embodiments of the present invention.

FIG. 14 is a flow chart of a process 1400 for model matching and scoring according to one or more embodiments of the invention. In FIG. 14, the example scenario applies to model 2 illustrated in FIGS. 11 and 12 but can apply to other models by analogy.

At block 1402, intelligent matching and scoring module 234 is configured to initialize the score to 0 for the given model. In this scenario, the sequential set index model 230 is model 2.

At block 1404, intelligent matching and scoring module 234 is configured to search/parse the cases in the organized/structured sequential data (i.e., actual data) from software program 220. For example, the organized/structured sequential data (i.e., actual data) has failed test case 1, failed test case 2, failed test case 3, and failed test case 4, which will be compared to the cases in model 2.

At blocks 1406, 1408, intelligent matching and scoring module 234 is configured to compare case 2 in model 2 to the actual data case 2 of the organized/structured sequential data for the software program 220 to check if they are the same.

At block 1410, if case 2 in model 2 matches the actual data case 2 of the organized/structured sequential data of software program 220, intelligent matching and scoring module 234 is configured to calculate the score for case 2 in model 2 as score=(1)·(0.3). Otherwise, the score for case 2 in model 2 is calculated as score=(0)·(0.3) at block 1412. In this example, the case-weight is 0.3, and since there is only one error point (i.e., one subcase), the error point gets the weight, so the default failure-weight is 1 in this case At blocks 1414, 1416, intelligent matching and scoring module 234 is configured to compare case 1 in model 2 to actual data case 1 of the organized/structured sequential data for the software program 220 to check if they are the same.

At block 1418, if case 1 in model 2 matches the actual data case 2 of the organized/structured sequential data of software program 220, intelligent matching and scoring module 234 is configured to calculate the score for case 1 in model 2 as score=(1)·(0.5)·(0.4). Otherwise, the score for case 1 in model 2 is calculated as score=(0)·(0.4) at block 1420. It is noted that case 1 of model 2 has two error points, for example, b1+b2, and there is a match to only one of the two error points. Particularly, there is no match to error point 5T:4890 in case 1 of model 2. Accordingly, the match is only half the value of the case-weight which is 0.4; as such, 0.5 is multiplied by the weight 0.4 to account for half the match, which is like saying that the failure-weight is 0.5. In some cases, the error points (i.e., subcases) for a case each have an equal failure-weight that is summed together and multiplied by the case-weight.

At blocks 1422, 1424, intelligent matching and scoring module 234 is configured to compare case 4 in model 2 to actual data case 4 of organized/structured sequential data for the software program 220 to check if they are the same.

At block 1426, if case 4 in model 2 matches the actual data case 4 of the organized/structured sequential data of software program 220, intelligent matching and scoring module 234 is configured to calculate the score for case 4 of model 2 as score=(1) (0.3), where 0.3 is the case-weight for case 4. Otherwise, the score for case 4 in model 2 is calculated as score=(0) (0.3) at block 1428. In this example, the two error points of case 4 both match the actual data case 4 of the organized/structured sequential data. In other words, failure-weights c1+c2=1.

At block 1430, intelligent matching and scoring module 234 is configured to sum the scores for case 2, case 1, and case 4 of model 2 which equals a total model score of 0.8 for model 2. The model score 0.8 is equal to and/or greater than a threshold score for the model. Accordingly, software program 220 is determined to have the root cause X, just as model 2. It should be appreciated that the matching to the cases does not have to be an exact match. When performing model matching, there is no need for absolute matching in terms of time because a margin of error before and after is allowed; also, in some cases, only the order of occurrence at the corresponding calculation level needs to be matched, and the time sequence can even be ignored according to the needs of the user to become a pure set index matching and calculation that does not consider the time sequence. Users can use this module to make corresponding customizations according to their actual needs.

Figure 15:
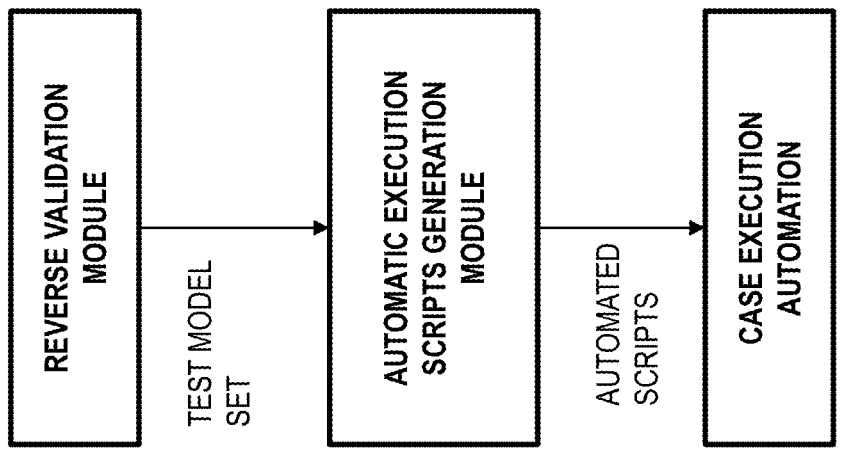
FIG. 15 depicts a block diagram of an example scenario according to one or more embodiments of the present invention.

FIG. 15 depicts a block diagram of an example scenario according to one or more embodiments of the invention. The online products (e.g., software executed on one or more computer systems) of internet enterprises iterate fast and need to be brought online quickly. When a new or modified function of software program 220 is in a hurry test to release, it is necessary to give preference to the relative cases with high severity level in one example, it would be better to automatically run those test cases in the order in which errors are most likely to occur, according to one or more embodiments.

Using the sequential set index models 230 as discussed herein, software applications 204 are configured to quickly generate a test model set with relative test cases including various test models in which the models match the designated severity level. Accordingly, users can automate the regression test for the software program 220, thereby reducing the possibility of serious problems appearing after the launch of the software program 220.

Figure 16:
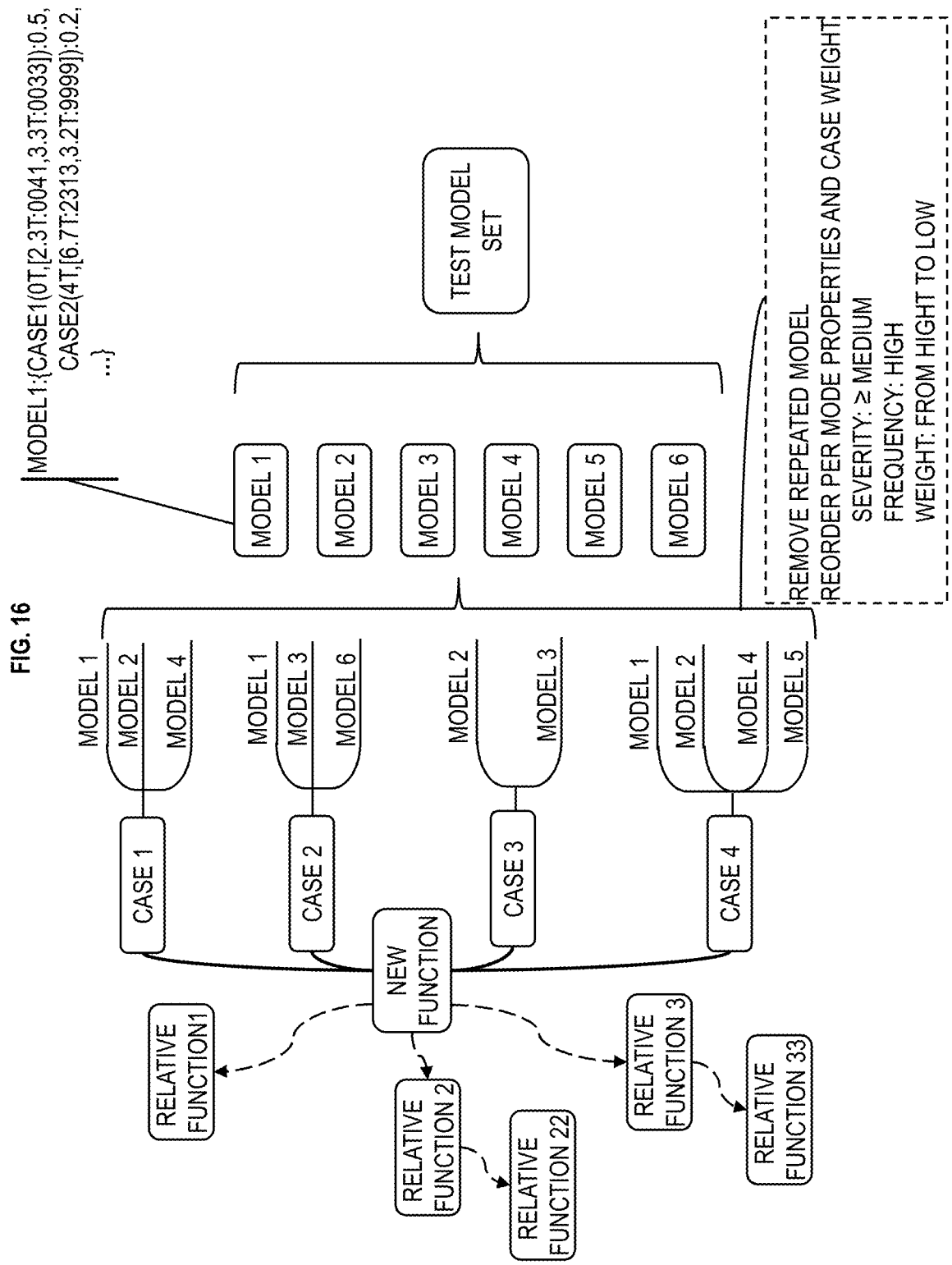
FIG. 16 depicts a block diagram of a chart illustrating how the test model set is generated according to one or more embodiments of the present invention.

FIG. 16 depicts a block diagram of a chart illustrating how the test model set is generated according to one or more embodiments of the invention. Particularly, FIG. 16 illustrates how the reverse validation module 236 works. In FIG. 16, the test model set is generated through the reverse verification module when a new or modified function is to be tested. First, the reverse verification module 236 is configured to filter the test cases from the test cases database 262 based on their relevance, and then filter the models containing these cases from the sequence set index model set (i.e., sequential set index models 230) based on these cases. Next, the reverse verification module 236 is configured to perform the de-duplication process, then remove the models that do not meet the severity level, and finally sort these models according to the frequency of occurrence and the case weight from high to low, thereby obtaining a set of test models.

Figure 17:
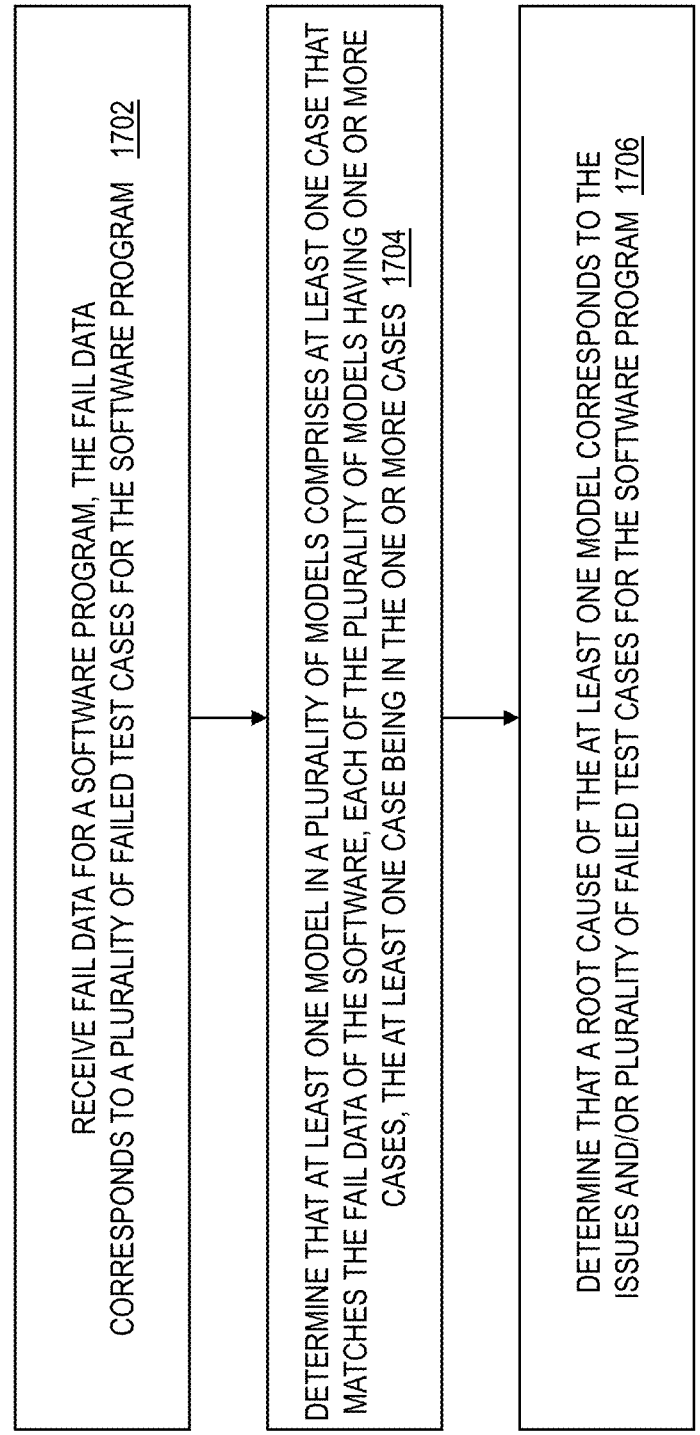
FIG. 17 is a flowchart of a computer-implemented method for using sequential set index models to locate the root cause of issues and perform problem verification, thereby debugging software for execution on a computer system according to one or more embodiments of the present invention.

FIG. 17 is a flowchart of a computer-implemented method 1700 for using sequential set index models 230 to quickly locate the root cause of issues and problem verification, thereby debugging software program 220 for execution on a computer system according to one or more embodiments of the invention.

At block 1702, software applications 204 are configured to receive fail data (e.g., organized/structured sequential data) of issues for software program 220, the fail data is for a plurality of failed test cases 242 for the software program 220. At block 1704, software applications 204 are configured to determine that at least one model in a plurality of models (e.g., sequential set index models 230) includes at least one case (e.g., case 1, 2, 3, 4, etc.) that matches the fail data of the software program 220, each of the plurality of models (e.g., sequential set index models 230) having one or more cases (e.g., case 1, 2, 3, 4, etc.), the at least one case being in the one or more cases. At block 1706, software applications 204 are configured to determine that a root cause of the at least one model corresponds to the issues and/or plurality of failed test cases 242 for the software program 220.

The plurality of models (e.g., sequential set index models 230) are each scored based on their one or more cases respectively matching the fail data. A score for the at least one model is determined, the score is based on the at least one case matching the fail data. The at least one case matches the fail data based on an error time and an error code. The plurality of models are configured to store information in a data structure (e.g., data structures 232). The plurality of models are configured to store information in a data structure, the data structure comprising a root cause number, a model property, case relevant start time, and case relevant error time. The plurality of models are configured to store information in a data structure, the data structure comprising a case failure number, a case weight, and a failure weight.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 18:
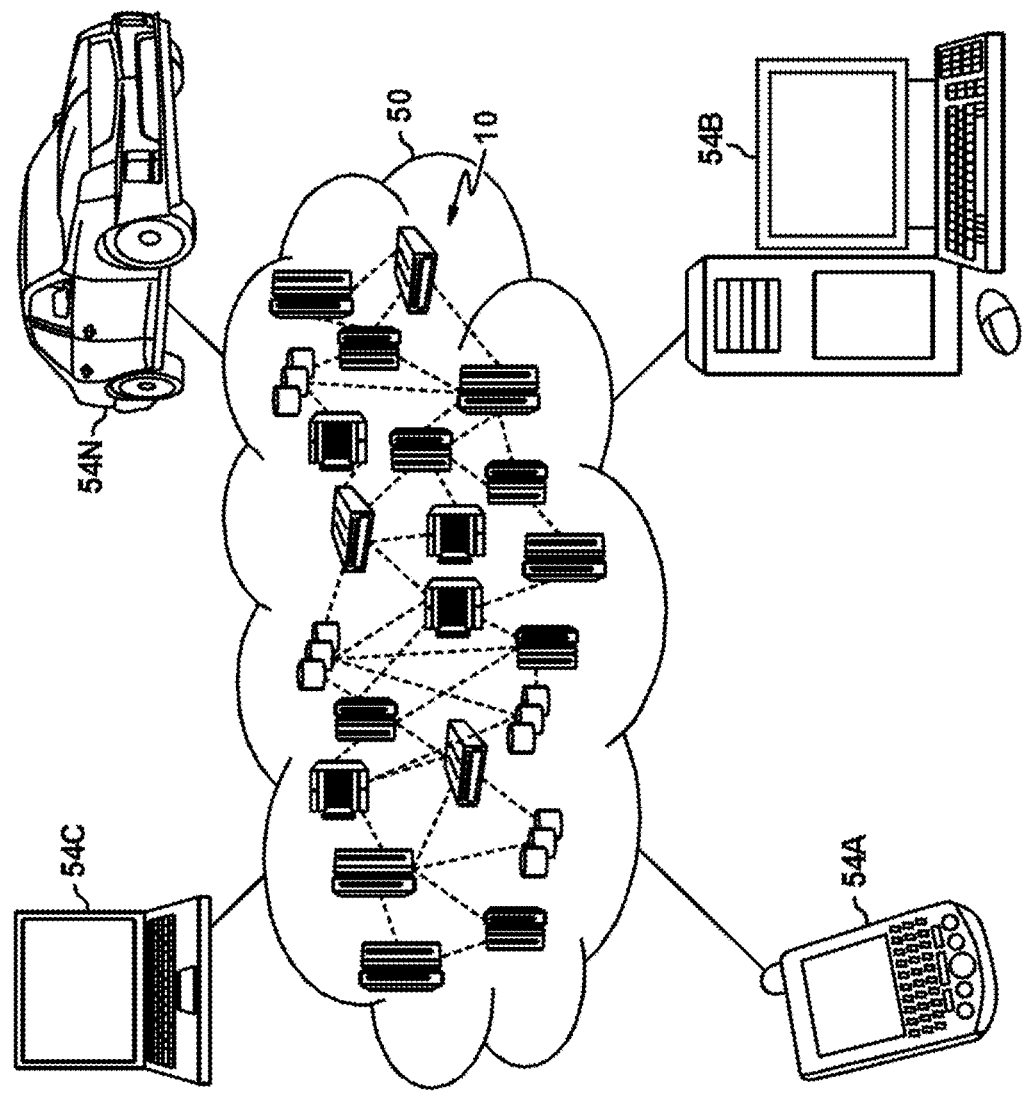
FIG. 18 depicts a cloud computing environment according to one or more embodiments of the present invention.

Referring now to FIG. 18, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 18 are intended to be illustrative only and that computing nodes 10 and cloud computing environment 50 can communicate with any type of computerized device over any type of network and/or network addressable connection (e.g., using a web browser).

Figure 19:
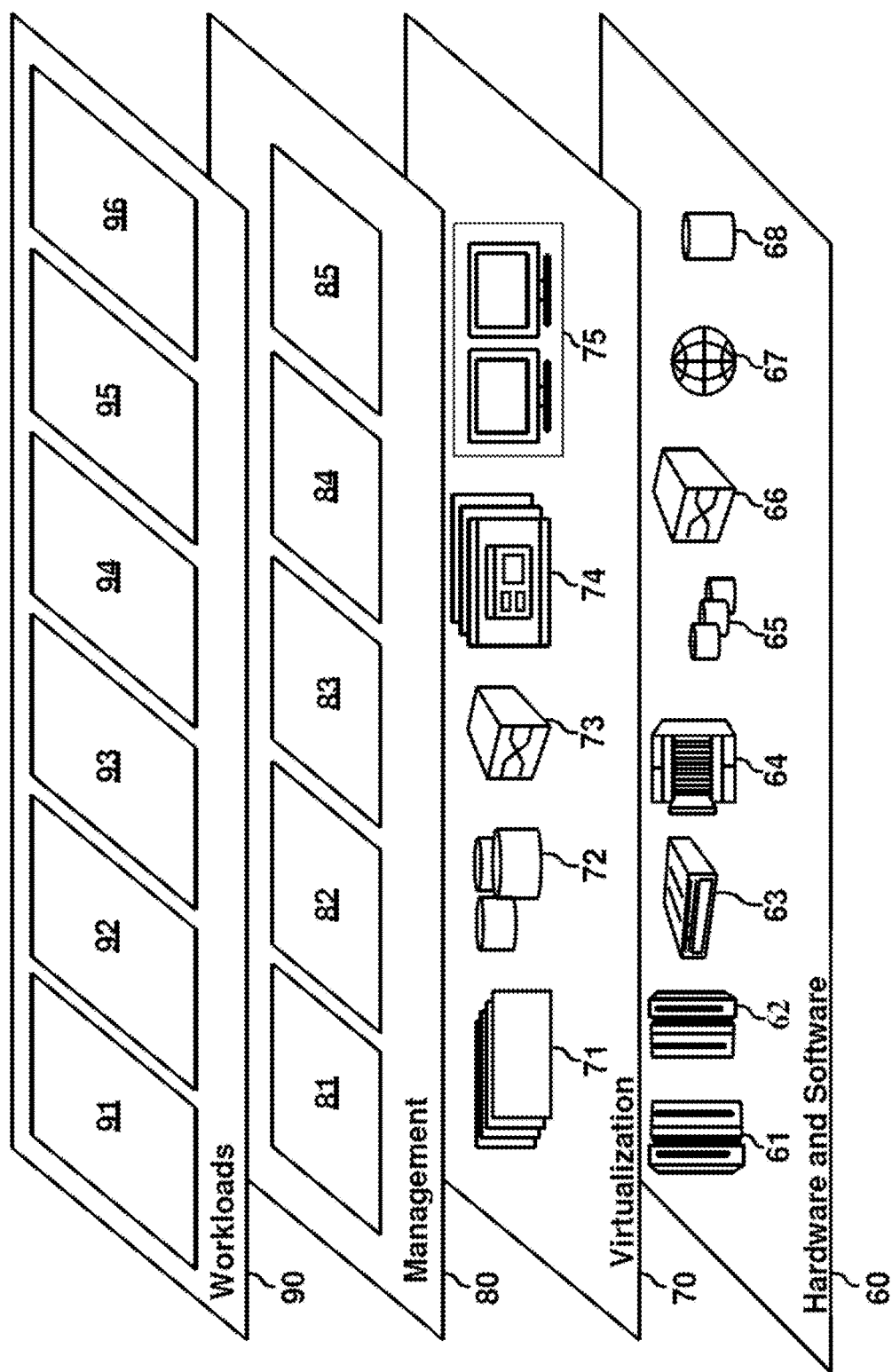
FIG. 19 depicts abstraction model layers according to one or more embodiments of the present invention.

Referring now to FIG. 19, a set of functional abstraction layers provided by cloud computing environment 50 (FIG. 18) is shown. It should be understood in advance that the components, layers, and functions shown in FIG. 19 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96. Workloads and functions 96 may include various software applications in (and/or performs various functions) in computer systems 200 as discussed herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising: receiving fail data for a software program, the fail data corresponding to a plurality of failed test cases for the software program; determining that at least one model in a plurality of models comprises at least one case that matches the fail data of the software program, each of the plurality of models having one or more cases, the at least one case being in the one or more cases; and determining that a root cause of the at least one model corresponds to the plurality of failed test cases for the software program.

2. The computer-implemented method of claim 1, wherein the plurality of models are scored based on the one or more cases matching the fail data.

3. The computer-implemented method of claim 1, wherein a score for the at least one model is determined based on the at least one case matching the fail data.

4. The computer-implemented method of claim 1, wherein the at least one case is determined to match the fail data based at least in part on an error time and an error code.

5. The computer-implemented method of claim 1, wherein the plurality of models are configured to store information in a data structure.

6. The computer-implemented method of claim 1, wherein the plurality of models are configured to store information in a data structure, the data structure comprising a root cause number, a model property, a case relevant start time, and a case relevant error time.

7. The computer-implemented method of claim 1, wherein the plurality of models are configured to store information in a data structure, the data structure comprising a case failure number, a case weight, and a failure weight.

8. A system comprising:
a memory having computer readable instructions; and
one or more processors for executing the computer readable instructions, the computer readable instructions controlling the one or more processors to perform operations comprising:
receiving fail data for a software program, the fail data corresponding to a plurality of failed test cases for the software program;
determining that at least one model in a plurality of models comprises at least one case that matches the fail data of the software program, each of the plurality of models having one or more cases, the at least one case being in the one or more cases; and
determining that a root cause of the at least one model corresponds to the plurality of failed test cases for the software program.

9. The system of claim 8, wherein the plurality of models are scored based on the one or more cases matching the fail data.

10. The system of claim 8, wherein a score for the at least one model is determined based on the at least one case matching the fail data.

11. The system of claim 8, wherein the at least one case is determined to match the fail data based at least in part on an error time and an error code.

12. The system of claim 8, wherein the plurality of models are configured to store information in a data structure.

13. The system of claim 8, wherein the plurality of models are configured to store information in a data structure, the data structure comprising a root cause number, a model property, a case relevant start time, and a case relevant error time.

14. The system of claim 8, wherein the plurality of models are configured to store information in a data structure, the data structure comprising a case failure number, a case weight, and a failure weight.

15. A computer program product comprising a computer readable storage medium having program instructions embodied therewith, the program instructions executable by one or more processors to cause the one or more processors to perform operations comprising:
receiving fail data for a software program, the fail data corresponding to a plurality of failed test cases for the software program;
determining that at least one model in a plurality of models comprises at least one case that matches the fail data of the software program, each of the plurality of models having one or more cases, the at least one case being in the one or more cases; and
determining that a root cause of the at least one model corresponds to the plurality of failed test cases for the software program.

16. The computer program product of claim 15, wherein the plurality of models are scored based on the one or more cases matching the fail data.

17. The computer program product of claim 15, wherein a score for the at least one model is determined based on the at least one case matching the fail data.

18. The computer program product of claim 15, wherein the at least one case is determined to match the fail data based at least in part on an error time and an error code.

19. The computer program product of claim 15, wherein the plurality of models are configured to store information in a data structure.

20. The computer program product of claim 15, wherein the plurality of models are configured to store information in a data structure, the data structure comprising a root cause number, a model property, a case relevant start time, and a case relevant error time.

\* \* \* \* \*